(12) United States Patent
Kazakoff et al.

(10) Patent No.: US 9,855,980 B2
(45) Date of Patent: Jan. 2, 2018

(54) OPERATOR CABS AND METHODS FOR CONSTRUCTING SAME

(71) Applicant: ONE FIFTY LABS INC., Edmonton (CA)

(72) Inventors: Nicholas Joseph Kazakoff, Edmonton (CA); Zachary Lee Atkinson, Sherwood Park (CA); Ronald Gordon Van Der Linden, Edmonton (CA)

(73) Assignee: ONE FIFTY LABS INC., Edmonton, Alberta (CA)

( * ) Notice: Subject to any disclaimer, the term of this patent is extended or adjusted under 35 U.S.C. 154(b) by 0 days.

(21) Appl. No.: 14/973,568

(22) Filed: Dec. 17, 2015

(65) Prior Publication Data

US 2016/0176449 A1    Jun. 23, 2016

(30) Foreign Application Priority Data

Dec. 19, 2014 (CA) ..................................... 2875553

(51) Int. Cl.
  *B62D 33/06* (2006.01)
  *B62D 25/02* (2006.01)
  (Continued)

(52) U.S. Cl.
  CPC .......... *B62D 33/0617* (2013.01); *B23K 31/02* (2013.01); *B60J 1/008* (2013.01);
  (Continued)

(58) Field of Classification Search
  CPC ...... B60J 5/0487; B62D 25/02; B62D 29/007; B62D 33/06; B62D 33/0617
  (Continued)

(56) References Cited

U.S. PATENT DOCUMENTS 1,910,397 A    5/1933   Lewis
D112,757 S    12/1938   Taylor
(Continued)

FOREIGN PATENT DOCUMENTS

CN    101502915 A    8/2009
EP    2119618 B1    7/2012
EP    2671783 A2    12/2013

OTHER PUBLICATIONS

Photographs of Liebherr LTM 1250-6.1 operator cab product, downloaded from http://www.liebherr.com/AT/en-GB/products_at.wfw/id-3666-0/layout-PopupTabWide/item-ImageGalleryImage2280_29_4/measure-metric/tab-2280_29 on Mar. 4, 2015 (available to the public as early as May 27, 2013).
(Continued)

*Primary Examiner* — Jason S Daniels

(57) ABSTRACT

A method of constructing a wall assembly of an operator cab involves: fastening a generally planar inner surface of a sheet-metal exterior wall body of the wall assembly to a generally planar outer surface of a sheet-metal structural wall body of the wall assembly; and fastening a generally planar inner surface of the sheet-metal structural wall body to a generally planar outer surface of a sheet-metal interior wall body of the wall assembly. Also, a method of constructing an operator cab involves: fastening a floor body to first and second spaced-apart sheet-metal wall assemblies; fastening a rear wall body to the first and second sheet-metal wall assemblies and to the floor body; fastening a front wall body to the first and second sheet-metal wall assemblies and to the floor body; and fastening a ceiling body to the first and second sheet-metal wall assemblies. Operator cabs and kits are also disclosed.

22 Claims, 21 Drawing Sheets

(51) Int. Cl.
*B60J 5/04* (2006.01)
*B60J 1/00* (2006.01)
*B62D 29/00* (2006.01)
*B23K 31/02* (2006.01)
*B60J 1/02* (2006.01)
*B60J 5/06* (2006.01)

(52) U.S. Cl.
CPC .............. *B60J 1/02* (2013.01); *B60J 5/0487* (2013.01); *B60J 5/062* (2013.01); *B62D 25/02* (2013.01); *B62D 29/007* (2013.01)

(58) Field of Classification Search
USPC ..... 296/190.01, 190.04, 190.08, 190.11, 191
See application file for complete search history.

(56) References Cited

U.S. PATENT DOCUMENTS

| | | | |
|---|---|---|---|
| 2,256,890 A | 9/1941 | Brown | |
| D157,972 S | 4/1950 | Collin | |
| 2,997,333 A | 8/1961 | Kauffman | |
| 3,388,944 A | 6/1968 | Crehore | |
| 3,551,014 A | 12/1970 | Tamruchi | |
| D231,247 S | 4/1974 | Clancy | |
| D274,063 S | 5/1984 | Skaff et al. | |
| D276,758 S | 12/1984 | Krueck | |
| D288,206 S | 2/1987 | Moscovitch | |
| 4,702,516 A | 10/1987 | Martin | |
| D312,827 S | 12/1990 | Boddin et al. | |
| D317,011 S | 5/1991 | Boddin | |
| D323,659 S | 2/1992 | Jacobsson | |
| 5,096,253 A | 3/1992 | Jo et al. | |
| 5,273,340 A | 12/1993 | Nelson | |
| D381,178 S | 7/1997 | Feider | |
| D424,778 S | 5/2000 | Dahl | |
| 6,149,228 A | 11/2000 | O'Neill et al. | |
| 6,206,457 B1 | 3/2001 | Sakyo | |
| 6,220,656 B1 | 4/2001 | Martin | |
| D445,233 S | 7/2001 | Deroure | |
| D450,905 S | 11/2001 | Deroure | |
| D455,763 S | 4/2002 | Brandenburg, III et al. | |
| D463,461 S | 9/2002 | Yanagida | |
| D463,462 S | 9/2002 | Yanagida | |
| 6,450,564 B1* | 9/2002 | Sill ........................ | B62D 25/02 296/186.1 |
| D463,807 S | 10/2002 | Tamaru | |
| D471,213 S | 3/2003 | Kwak et al. | |
| 6,568,746 B2 | 5/2003 | Sakyo | |
| D479,536 S | 9/2003 | Dahl et al. | |
| D528,134 S | 9/2006 | Vandendriessche et al. | |
| D541,825 S | 5/2007 | Pettersson | |
| D549,245 S | 8/2007 | Antonetti | |
| D561,205 S | 2/2008 | Pettersson | |
| D579,028 S | 10/2008 | VanDeVeer et al. | |
| D594,480 S | 6/2009 | Gicquel et al. | |
| 7,575,266 B2 | 8/2009 | Sato | |
| 7,581,783 B2 | 9/2009 | Mori | |
| D605,207 S | 12/2009 | Menges et al. | |
| 7,708,299 B2 | 5/2010 | Duval | |
| D625,741 S | 10/2010 | Seidel et al. | |
| D635,156 S | 3/2011 | Berning et al. | |
| D637,630 S | 5/2011 | Yamamoto et al. | |
| D642,205 S | 7/2011 | Yamamoto et al. | |
| 8,052,202 B2 | 11/2011 | Nakamura | |
| 8,083,286 B2* | 12/2011 | Buda .................. | B62D 33/0612 296/190.08 |
| 8,096,052 B2 | 1/2012 | Hampel | |
| 8,152,223 B2* | 4/2012 | Beck ...................... | B62D 25/02 296/181.1 |
| D660,880 S | 5/2012 | Laugerette | |
| D660,881 S | 5/2012 | Bohme et al. | |
| D661,321 S | 6/2012 | Bohme et al. | |
| D667,851 S | 9/2012 | Warr | |
| D668,693 S | 10/2012 | Ringer | |
| D670,745 S | 11/2012 | Warr | |
| D671,566 S | 11/2012 | Fang et al. | |
| D678,360 S | 3/2013 | Kozai et al. | |
| D684,607 S | 6/2013 | Hagura | |
| D687,868 S | 8/2013 | Watson et al. | |
| 8,641,133 B1 | 2/2014 | Scaringe | |
| 8,944,201 B2* | 2/2015 | Krellner ............ | B60H 1/00378 165/42 |
| D751,123 S | 3/2016 | Kazakoff | |
| 2013/0119708 A1 | 5/2013 | Kondo et al. | |
| 2016/0107700 A1* | 4/2016 | Kaneko .................. | B62D 25/02 296/193.05 |

OTHER PUBLICATIONS

Drawing & photograph of LinkBelt HTC86100 operator cab product, extracted from http://www.linkbelt.com/lit/pdf/htc/ht86100/ht86100t.pdf and downloaded from http://www.directindustry.com/prod/link-belt/telescopic-cranes-diesel-truck-16716-595345.html, respectively on Mar. 4, 2015 (available to the public as early as May 27, 2013).

Photographs of Manitex TC700 operator cab product, downloaded from http://manitex.com/products.aspx?s=series_tc and http://www.badgerequipment.com/images/manitex-1.jpg, respectively on Mar. 4, 2015 (available to the public as early as May 27, 2013).

Photographs of Manitowoc/National Crane NBT45 operator cab product, extracted from http://www.manitowoccranes.com/~/media/Files/MTW Direct/National Crane/Telescoping Swing Seat/NBT45/Product Guides/NBT45-Product-Guide-Imperial.pdf on Mar. 4, 2015 (available to the public as early as May 27, 2013).

Photographs of Grove RT 540E operator cab product, extracted from http://www.manitowoccranes.com/~/media/Files/MTW Direct/Grove/Rough Terrain/RT540E/Product Guides/RT540E-Product-Guide-Imperial.pdf on Mar. 4, 2015 (available to the public as early as May 27, 2013).

Photographs of Tadano GR-550XL operator cab product, downloaded from http://tadanoamerica.com/products/gr-550x1/ and http://static.mascus.com/image/product/large/sandhillsapi/tadano-gr550xl-2,702117-14.jpg, respectively on Mar. 4, 2015 (available to the public as early as May 27, 2013).

Photographs of Sany Ultracab operator cab product, downloaded from http://r3.oemoffhighway.com/files/cygnus/image/OOH/2012/OCT/640x360/sany-ultracab-ext1_10817793.jpg and http://r3.oemoffhighway.com/files/cygnus/image/OOH/2012/OCT/640x360/sany-ultracab-ext2_10817794.jpg respectively on Mar. 4, 2015 (available to the public as early as May 27, 2013).

Photograph of CAT 320 Excavator operator cab product, downloaded from http://www.cat.com/en_US/products/new/equipment/excavators/medium-excavators/18254206.html on Mar. 4, 2015 (available to the public as early as May 27, 2013).

Photograph of Doosan S420LC-V operator cab product, downloaded from http://www.doosan-center.ru/assets/images/gussolar/s420lc_v_2_detail.jpg on Mar. 4, 2015 (available to the public as early as May 27, 2013).

Photograph of Hitachi ZX 190W operator cab product, extracted from http://hitachiconstruction.com/assets/files/products/Construction/ZX190W-3/ZX190W-3_FAB.pdf on Mar. 4, 2015 (available to the public as early as May 27, 2013).

Photograph of JCB JS Excavator operator cab product, extracted from http://www.jcb.ee/wp-content/uploads/JS360.pdf on Mar. 4, 2015 (available to the public as early as May 27, 2013).

Photograph of JCB Skid Steer operator cab product, downloaded from http://www.jcbna.com/~/media/WebSites/JCB/JCB%20USA/Range%20Brochures/3448_SSL-CTL%20Range%20BRO-Lo_email.ashx on Mar. 4, 2015 (available to the public as early as May 27, 2013).

Photograph of John Deere 190D Excavator operator cab product, extracted from https://www.deere.com/en_US/docs/construction/dmag/135CU_dmag_www_pdf on Mar. 4, 2015 (available to the public as early as May 27, 2013).

Photograph of Terex Genie GTH-5519 operator cab product, downloaded from http://www.genielift.com/en/products/telehandlers/

(56) References Cited

OTHER PUBLICATIONS compact-telehandler/gth5519/ on Mar. 4, 2015 (available to the public as early as May 27, 2013).
Photograph of Volvo EC340D Excavator operator cab product, extracted from http://www.volvoce.com/SiteCollectionDocuments/VCE/Documents%20Global/crawler%20excavators/ProductBrochure_EC340DtoEC480D_EN_22_20024201-B_2012.05.pdf on Mar. 4, 2015 (available to the public as early as May 27, 2013).

* cited by examiner

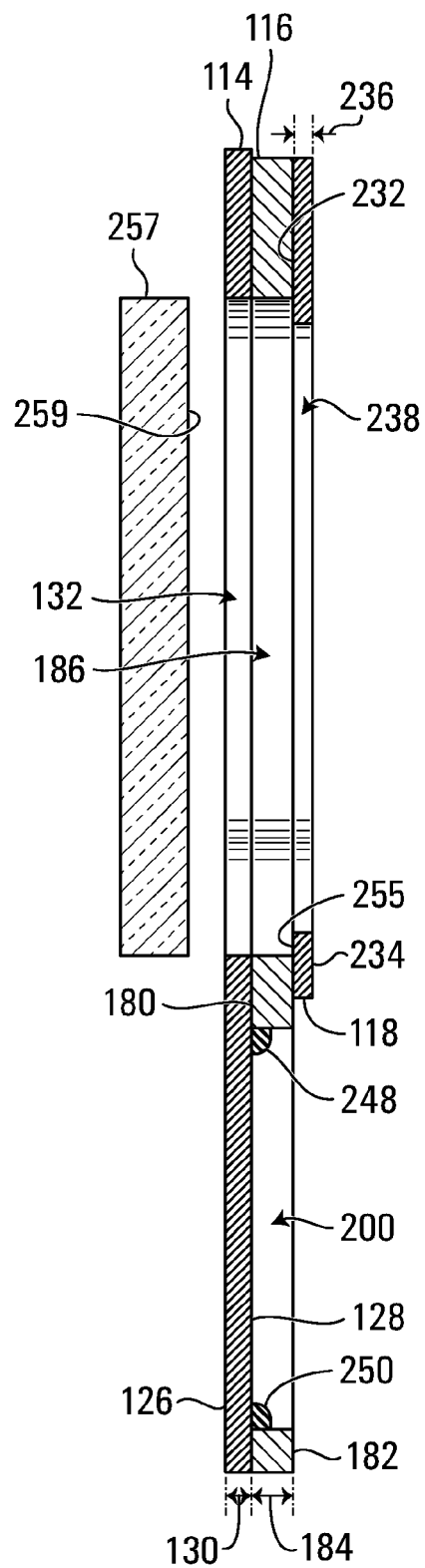
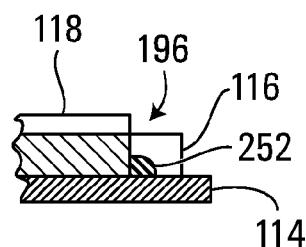
FIG. 7
FIG. 8

OPERATOR CABS AND METHODS FOR CONSTRUCTING SAME

CROSS-REFERENCE TO RELATED APPLICATION

This application claims the benefit of, and priority to, Canadian patent application no. 2,875,553 filed Dec. 19, 2014, the entire contents of which are incorporated by reference herein.

FIELD

This disclosure relates generally to operator cabs, and also to methods and kits for constructing operator cabs.

RELATED ART

Operator cabs (also known as operator cabins, cabs, enclosures, control cabins, or equipment cabs, for example) generally enclose a seat and controls, and may provide both protection and comfort for operators of various types of equipment such as trucks, cranes, soil-moving equipment, and agricultural equipment.

Many known operator cabs may include structural frame elements (such as beams, pipes, tubes, pillars, formed members, or members, for example) that must be shaped and fastened to form an operator cab frame, and floor, wall, and ceiling bodies may be supported by the frame. However, such structural frame elements can add weight to the operator cabs and reduce usable space inside the operator cabs. Further, such structural frame elements are often metal extrusions, which can be difficult to cut, bend, otherwise shape, and position precisely into desired shapes and positions, and which may therefore limit design options for the operator cabs or increase cost of the operator cabs.

SUMMARY

According to one embodiment, there is disclosed a method of constructing a wall assembly of an operator cab, the method comprising: fastening a generally planar inner surface of a sheet-metal exterior wall body of the wall assembly to a generally planar outer surface of a sheet-metal structural wall body of the wall assembly; and fastening a generally planar inner surface of the sheet-metal structural wall body to a generally planar outer surface of a sheet-metal interior wall body of the wall assembly.

The sheet-metal structural wall body may define a window opening extending between the generally planar inner surface of the sheet-metal structural wall body and the generally planar outer surface of the sheet-metal structural wall body.

The sheet-metal interior wall body may define a window opening extending between a generally planar inner surface of the sheet-metal interior wall body and the generally planar outer surface of the sheet-metal interior wall body.

The window opening defined by the sheet-metal structural wall body may be larger than the window opening defined by the sheet-metal interior wall body.

Fastening the generally planar inner surface of the sheet-metal structural wall body to the generally planar outer surface of the sheet-metal interior wall body may comprise fastening the generally planar inner surface of the sheet-metal structural wall body to the generally planar outer surface of the sheet-metal interior wall body in a position in which a portion of the generally planar outer surface of the sheet-metal interior wall body faces into the window opening defined by the sheet-metal structural wall body.

The method may further comprise, when at least a portion of a window is received within the window opening defined by the sheet-metal structural wall body, fastening a generally planar inner surface of the window to the portion of the generally planar outer surface of the sheet-metal interior wall body.

Fastening the generally planar inner surface of the window to the portion of the generally planar outer surface of the sheet-metal interior wall body may comprise adhering the generally planar inner surface of the window to the portion of the generally planar outer surface of the sheet-metal interior wall body.

The sheet-metal structural wall body may define at least one weight-reducing opening, in addition to the window opening defined by the sheet-metal structural wall body, extending between the generally planar inner surface of the sheet-metal structural wall body and the generally planar outer surface of the sheet-metal structural wall body.

Fastening the generally planar inner surface of the sheet-metal exterior wall body to the generally planar outer surface of the sheet-metal structural wall body may comprise fastening the generally planar inner surface of the sheet-metal exterior wall body to the generally planar outer surface of the sheet-metal structural wall body when a portion of the sheet-metal exterior wall body covers the at least one weight-reducing opening.

The method may further comprise, before fastening the generally planar inner surface of the sheet-metal exterior wall body to the generally planar outer surface of the sheet-metal structural wall body, aligning the sheet-metal exterior wall body relative to the sheet-metal structural wall body.

The method may further comprise, before fastening the generally planar inner surface of the sheet-metal structural wall body to the generally planar outer surface of the sheet-metal interior wall body, aligning the sheet-metal structural wall body relative to the sheet-metal interior wall body.

Aligning the sheet-metal exterior wall body relative to the sheet-metal structural wall body and aligning the sheet-metal structural wall body relative to the sheet-metal interior wall body may comprise positioning a plurality of fasteners through respective alignment holes in the sheet-metal exterior wall body, through respective alignment holes in the sheet-metal structural wall body, and through respective alignment holes in the sheet-metal interior wall body.

Fastening the generally planar inner surface of the sheet-metal exterior wall body to the generally planar outer surface of the sheet-metal structural wall body may comprise welding the sheet-metal exterior wall body to the sheet-metal structural wall body.

Fastening the generally planar inner surface of the sheet-metal structural wall body to the generally planar outer surface of the sheet-metal interior wall body may comprise welding the sheet-metal structural wall body to the sheet-metal interior wall body.

The method may further comprise fastening a floor body to the sheet-metal wall assembly.

Fastening the floor body to the sheet-metal wall assembly may comprise fastening the floor body directly to the sheet-metal wall assembly.

Fastening the floor body directly to the sheet-metal wall assembly may comprise welding the floor body to the sheet-metal wall assembly.

The method may further comprise forming the floor body.

The method may further comprise fastening a ceiling body to the sheet-metal wall assembly.

Fastening the ceiling body to the sheet-metal wall assembly may comprise fastening the ceiling body directly to the sheet-metal wall assembly.

Fastening the ceiling body directly to the sheet-metal wall assembly may comprise welding the ceiling body to the sheet-metal wall assembly.

The method may further comprise forming the ceiling body.

The method may further comprise fastening a rear wall body to the sheet-metal wall assembly.

Fastening the rear wall body to the sheet-metal wall assembly may comprise fastening the rear wall body directly to the sheet-metal wall assembly.

Fastening the rear wall body directly to the sheet-metal wall assembly may comprise welding the rear wall body to the sheet-metal wall assembly.

The method may further comprise forming the rear wall body.

The method may further comprise fastening a front wall body to the sheet-metal wall assembly.

Fastening the front wall body to the sheet-metal wall assembly may comprise fastening the front wall body directly to the sheet-metal wall assembly.

Fastening the front wall body directly to the sheet-metal wall assembly may comprise welding the front wall body to the sheet-metal wall assembly.

The method may further comprise forming the front wall body.

The method may further comprise forming the sheet-metal exterior wall body.

Forming the sheet-metal exterior wall body may comprise fastening together first and second generally coplanar sheet-metal portions.

The method may further comprise forming the sheet-metal structural wall body.

Forming the sheet-metal structural wall body may comprise fastening together first and second generally coplanar sheet-metal portions.

The method may further comprise forming the sheet-metal interior wall body.

According to another embodiment, there is disclosed a method of preparing materials for use in construction of an operator cab, the method comprising: forming a sheet-metal exterior wall body comprising a generally planar inner surface and defining a window opening sized to receive a window; forming a sheet-metal structural wall body comprising a generally planar inner surface and a generally planar outer surface, and defining a window opening sized to receive the window; and forming a sheet-metal interior wall body comprising a generally planar outer surface and defining a window opening such that, when the generally planar inner surface of the sheet-metal exterior wall body is fastened to the generally planar outer surface of the sheet-metal structural wall body with the window opening of the sheet-metal exterior wall body aligned with the window opening of the sheet-metal structural wall body, and when the generally planar inner surface of the sheet-metal structural wall body is fastened to the generally planar outer surface of the sheet-metal interior wall body with the window opening of the sheet-metal structural wall body aligned with the window opening of the sheet-metal interior wall body, a portion of the generally planar outer surface of the sheet-metal interior wall body is positioned to face into the window opening defined by the sheet-metal structural wall body.

Forming the sheet-metal structural wall body may comprise forming at least one weight-reducing opening, in addition to the window opening, extending between the generally planar inner surface of the sheet-metal structural wall body and the generally planar outer surface of the sheet-metal structural wall body.

Forming the sheet-metal exterior wall body may comprise forming the sheet-metal exterior wall body to cover the at least one weight-reducing opening when the generally planar inner surface of the sheet-metal exterior wall body is fastened to the generally planar outer surface of the sheet-metal structural wall body with the window opening of the sheet-metal exterior wall body aligned with the window opening of the sheet-metal structural wall body.

Forming the sheet-metal exterior wall body may comprise forming, in the sheet-metal exterior wall body, a plurality of alignment holes. Forming the sheet-metal structural wall body may comprise forming, in the sheet-metal structural wall body, a plurality of alignment holes aligned with respective ones of the plurality of alignment holes in the sheet-metal exterior wall body. Forming the sheet-metal interior wall body may comprise forming, in the sheet-metal interior wall body, a plurality of alignment holes aligned with respective ones of the plurality of alignment holes in the sheet-metal exterior wall body and with respective ones of the plurality of alignment holes in the sheet-metal structural wall body. When the plurality of alignment holes in the sheet-metal interior wall body are aligned with the respective ones of the plurality of alignment holes in the sheet-metal structural wall body and with the respective ones of the plurality of alignment holes in the sheet-metal exterior wall body, the window opening of the sheet-metal interior wall body may be aligned with the window opening of the sheet-metal structural wall body and the window opening of the sheet-metal structural wall body may be aligned with the window opening of the sheet-metal exterior wall body.

The method may further comprise forming a sheet-metal front wall body.

Forming the sheet-metal front wall body may comprise bending the sheet-metal front wall body to a shape in which at least a portion of a lateral edge of the sheet-metal front wall body is complementary to at least a portion of a front edge of the sheet-metal structural wall body.

Bending the sheet-metal front wall body may comprise causing at least a portion of the sheet-metal front wall body to curve at a generally constant radius of curvature relative to a generally transverse axis of rotation.

Forming the sheet-metal exterior wall body may comprise fastening together first and second generally coplanar sheet-metal portions.

Forming the sheet-metal structural wall body may comprise fastening together first and second generally coplanar sheet-metal portions.

The sheet-metal structural wall body may be thicker than the sheet-metal exterior wall body.

The sheet-metal structural wall body may be thicker than the sheet-metal interior wall body.

The sheet-metal exterior wall body may be thicker than the sheet-metal interior wall body.

The sheet-metal exterior wall body may have a thickness from about 2 mm to about 4 mm.

The sheet-metal exterior wall body may have a thickness of about 3.0 mm.

The sheet-metal structural wall body may have a thickness from about 5 mm to about 7 mm.

The sheet-metal structural wall body may have a thickness of about 6.4 mm.

The sheet-metal interior wall body may have a thickness from about 1 mm to about 3 mm.

The sheet-metal interior wall body may have a thickness of about 1.9 mm.

According to another embodiment, there is disclosed a method of constructing an operator cab, the method comprising: fastening a floor body to first and second spaced-apart sheet-metal wall assemblies; fastening a rear wall body to the first and second sheet-metal wall assemblies and to the floor body; fastening a front wall body to the first and second sheet-metal wall assemblies and to the floor body; and fastening a ceiling body to the first and second sheet-metal wall assemblies.

Fastening the floor body to the first and second sheet-metal wall assemblies may comprise fastening the floor body directly to the first and second sheet-metal wall assemblies.

Fastening the floor body directly to the first and second sheet-metal wall assemblies may comprise welding the floor body to the first and second sheet-metal wall assemblies.

Fastening the rear wall body to the first and second sheet-metal wall assemblies may comprise fastening the rear wall body directly to the first and second sheet-metal wall assemblies.

Fastening the rear wall body directly to the first and second sheet-metal wall assemblies may comprise welding the rear wall body to the first and second sheet-metal wall assemblies.

Fastening the front wall body to the first and second sheet-metal wall assemblies may comprise fastening the front wall body directly to the first and second sheet-metal wall assemblies.

Fastening the front wall body directly to the first and second sheet-metal wall assemblies may comprise welding the front wall body to the first and second sheet-metal wall assemblies.

Fastening the ceiling body to the first and second sheet-metal wall assemblies may comprise fastening the ceiling body directly to the first and second sheet-metal wall assemblies.

Fastening the ceiling body directly to the first and second sheet-metal wall assemblies may comprise welding the ceiling body to the first and second sheet-metal wall assemblies.

The first wall assembly may comprise a first sheet-metal exterior wall body comprising a generally planar inner surface. The first wall assembly may further comprise a first sheet-metal structural wall body comprising a generally planar inner surface and a generally planar outer surface. The generally planar inner surface of first the sheet-metal exterior wall body may be fastened to the generally planar outer surface of the first sheet-metal structural wall body. The first wall assembly may further comprise a first sheet-metal interior wall body comprising a generally planar outer surface. The generally planar inner surface of the first sheet-metal structural wall body may be fastened to the generally planar outer surface of the first sheet-metal interior wall body. The second wall assembly may comprise a second sheet-metal exterior wall body comprising a generally planar inner surface. The second wall assembly may further comprise a second sheet-metal structural wall body comprising a generally planar inner surface and a generally planar outer surface. The generally planar inner surface of the second sheet-metal exterior wall body may be fastened to the generally planar outer surface of the second sheet-metal structural wall body. The second wall assembly may further comprise a second sheet-metal interior wall body comprising a generally planar outer surface. The generally planar inner surface of the second sheet-metal structural wall body may be fastened to the generally planar outer surface of the second sheet-metal interior wall body.

Each of the first and second sheet-metal structural wall bodies may define at least one weight-reducing opening extending between the generally planar inner surface and the generally planar outer surface.

Fastening the rear wall body to the first sheet-metal wall assembly and to the floor body may comprise fastening the rear wall body to the first sheet-metal wall assembly and to the floor body after fastening the floor body to the first sheet-metal wall assembly. Fastening the rear wall body and the floor body to the second sheet-metal wall assembly may comprise fastening the rear wall body and the floor body to the second sheet-metal wall assembly after fastening the rear wall body to the first sheet-metal wall assembly and to the floor body. Fastening the ceiling body to the first and second sheet-metal wall assemblies may comprise fastening the ceiling body to the first and second sheet-metal wall assemblies after fastening the rear wall body and the floor body to the second sheet-metal wall assembly. Fastening the front wall body to the first and second sheet-metal wall assemblies and to the floor body may comprise fastening the front wall body to the first and second sheet-metal wall assemblies and to the floor body after fastening the ceiling body to the first and second sheet-metal wall assemblies.

The method may further comprise mounting a door assembly to the second sheet-metal wall assembly to allow the door assembly to slide relative to the second sheet-metal wall assembly.

The door assembly may comprise a third sheet-metal exterior wall body comprising a generally planar inner surface. The door assembly may further comprise a third sheet-metal structural wall body comprising a generally planar inner surface and a generally planar outer surface. The generally planar inner surface of the third sheet-metal exterior wall body may be fastened to the generally planar outer surface of the third sheet-metal structural wall body. The door assembly may further comprise a third sheet-metal interior wall body comprising a generally planar outer surface. The generally planar inner surface of the third sheet-metal structural wall body may be fastened to the generally planar outer surface of the third sheet-metal interior wall body.

The operator cab may be sized to contain a single human operator of machinery.

According to another embodiment, there is disclosed an operator cab constructed according to any one of the methods.

According to another embodiment, there is disclosed an operator cab comprising a wall assembly comprising: a sheet-metal exterior wall body comprising a generally planar inner surface; a sheet-metal structural wall body comprising a generally planar inner surface and a generally planar outer surface, wherein the generally planar inner surface of the sheet-metal exterior wall body is fastened to the generally planar outer surface of the sheet-metal structural wall body; and a sheet-metal interior wall body comprising a generally planar outer surface, wherein the generally planar inner surface of the sheet-metal structural wall body is fastened to the generally planar outer surface of the sheet-metal interior wall body.

The sheet-metal structural wall body may define a window opening extending between the generally planar inner surface of the sheet-metal structural wall body and the generally planar outer surface of the sheet-metal structural wall body.

The sheet-metal interior wall body may define a window opening extending between a generally planar inner surface of the sheet-metal interior wall body and the generally planar outer surface of the sheet-metal interior wall body.

The window opening defined by the sheet-metal structural wall body may be larger than the window opening defined by the sheet-metal interior wall body.

A portion of the generally planar outer surface of the sheet-metal interior wall body may face into the window opening defined by the sheet-metal structural wall body.

The operator cab may further comprise a window comprising a generally planar inner surface. At least a portion of the window may be received within the window opening defined by the sheet-metal structural wall body. The generally planar inner surface of the window may be fastened to the portion of the generally planar outer surface of the sheet-metal interior wall body.

The generally planar inner surface of the window may be adhered to the portion of the generally planar outer surface of the sheet-metal interior wall body.

The sheet-metal structural wall body may define at least one weight-reducing opening, in addition to the window opening defined by the sheet-metal structural wall body, extending between the generally planar inner surface of the sheet-metal structural wall body and the generally planar outer surface of the sheet-metal structural wall body.

A portion of the sheet-metal exterior wall body may cover the at least one weight-reducing opening.

The sheet-metal exterior wall body may be welded to the sheet-metal structural wall body.

The sheet-metal structural wall body may be welded to the sheet-metal interior wall body.

The operator cab may further comprise a floor body fastened to the sheet-metal wall assembly.

The floor body may be fastened directly the floor body directly to the sheet-metal wall assembly.

The floor body may be welded to the sheet-metal wall assembly.

The operator cab may further comprise a ceiling body fastened to the sheet-metal wall assembly.

The ceiling body may be fastened directly to the sheet-metal wall assembly.

The ceiling body may be welded to the sheet-metal wall assembly.

The operator cab may further comprise a rear wall body fastened to the sheet-metal wall assembly.

The rear wall body may be fastened directly to the sheet-metal wall assembly.

The rear wall body may be welded to the sheet-metal wall assembly.

The operator cab may further comprise a front wall body fastened to the sheet-metal wall assembly.

The front wall body may be fastened directly to the sheet-metal wall assembly.

The front wall body may be welded to the sheet-metal wall assembly.

A portion of a lateral edge of the sheet-metal front wall body may be complementary to at least a portion of a front edge of the sheet-metal structural wall body.

A portion of the sheet-metal front wall body may be curved at a generally constant radius of curvature relative to a generally transverse axis of rotation.

The sheet-metal exterior wall body may comprise first and second generally coplanar sheet-metal portions fastened together.

The sheet-metal structural wall body may comprise first and second generally coplanar sheet-metal portions fastened together.

The sheet-metal structural wall body may be thicker than the sheet-metal exterior wall body.

The sheet-metal structural wall body may be thicker than the sheet-metal interior wall body.

The sheet-metal exterior wall body may be thicker than the sheet-metal interior wall body.

The sheet-metal exterior wall body may have a thickness from about 2 mm to about 4 mm.

The sheet-metal exterior wall body may have a thickness of about 3.0 mm.

The sheet-metal structural wall body may have a thickness from about 5 mm to about 7 mm.

The sheet-metal structural wall body may have a thickness of about 6.4 mm.

The sheet-metal interior wall body may have a thickness from about 1 mm to about 3 mm.

The sheet-metal interior wall body may have a thickness of about 1.9 mm.

According to another embodiment, there is disclosed an operator cab comprising: first and second spaced-apart sheet-metal wall assemblies; a floor body fastened to the first and second spaced-apart sheet-metal wall assemblies; a rear wall body fastened to the first and second sheet-metal wall assemblies and to the floor body; a front wall body fastened to the first and second sheet-metal wall assemblies and to the floor body; and a ceiling body fastened to the first and second sheet-metal wall assemblies.

The floor body may be fastened directly to the first and second sheet-metal wall assemblies.

The floor body may be welded to the first and second sheet-metal wall assemblies.

The rear wall body may be fastened directly to the first and second sheet-metal wall assemblies.

The rear wall body may be welded to the first and second sheet-metal wall assemblies.

The front wall body may be fastened directly to the first and second sheet-metal wall assemblies.

The front wall body may be welded to the first and second sheet-metal wall assemblies.

The ceiling body may be fastened directly to the first and second sheet-metal wall assemblies.

The ceiling body may be welded to the first and second sheet-metal wall assemblies.

The first wall assembly may comprise a first sheet-metal exterior wall body comprising a generally planar inner surface. The first wall assembly may further comprise a first sheet-metal structural wall body comprising a generally planar inner surface and a generally planar outer surface. The generally planar inner surface of first the sheet-metal exterior wall body may be fastened to the generally planar outer surface of the first sheet-metal structural wall body. The first wall assembly may further comprise a first sheet-metal interior wall body comprising a generally planar outer surface. The generally planar inner surface of the first sheet-metal structural wall body may be fastened to the generally planar outer surface of the first sheet-metal interior wall body. The second wall assembly may comprise a second sheet-metal exterior wall body comprising a generally planar inner surface. The second wall assembly may further comprise a second sheet-metal structural wall body comprising a generally planar inner surface and a generally planar outer surface. The generally planar inner surface of the second sheet-metal exterior wall body may be fastened to the generally planar outer surface of the second sheet-metal structural wall body. The second wall assembly may further comprise a second sheet-metal interior wall body comprising a generally planar outer surface. The generally planar inner surface of the second sheet-metal structural wall body may be fastened to the generally planar outer surface of the second sheet-metal interior wall body.

Each of the first and second sheet-metal structural wall bodies may define at least one weight-reducing opening extending between the generally planar inner surface and the generally planar outer surface.

The operator cab may further comprise a door assembly mounted to the second sheet-metal wall assembly to allow the door assembly to slide relative to the second sheet-metal wall assembly.

The door assembly may comprise a third sheet-metal exterior wall body comprising a generally planar inner surface. The door assembly may further comprise a third sheet-metal structural wall body comprising a generally planar inner surface and a generally planar outer surface. The generally planar inner surface of the third sheet-metal exterior wall body may be fastened to the generally planar outer surface of the third sheet-metal structural wall body. The door assembly may further comprise a third sheet-metal interior wall body comprising a generally planar outer surface. The generally planar inner surface of the third sheet-metal structural wall body may be fastened to the generally planar outer surface of the third sheet-metal interior wall body.

The operator cab may be sized to contain a single human operator of machinery.

According to another embodiment, there is disclosed a crane comprising any one of the operator cabs.

According to another embodiment, there is disclosed a kit for use in constructing an operator cab, the kit comprising: a sheet-metal exterior wall body comprising a generally planar inner surface and defining a window opening sized to receive a window; a sheet-metal structural wall body comprising a generally planar inner surface and a generally planar outer surface and defining a window opening sized to receive the window; and a sheet-metal interior wall body comprising a generally planar outer surface and defining a window opening such that, when the generally planar inner surface of the sheet-metal structural wall body is fastened to the generally planar outer surface of the sheet-metal interior wall body with the window opening of the sheet-metal structural wall body aligned with the window opening of the sheet-metal exterior wall body, and when the generally planar inner surface of the sheet-metal interior wall body is fastened to the generally planar outer surface of the sheet-metal structural wall body with the window opening of the sheet-metal interior wall body aligned with the window opening of the sheet-metal structural wall body, a portion of the generally planar outer surface of the sheet-metal interior wall body is positioned to face into the window opening defined by the sheet-metal structural wall body.

Other aspects and features will become apparent to those ordinarily skilled in the art upon review of the following description of illustrative embodiments in conjunction with the accompanying figures.

BRIEF DESCRIPTION OF THE DRAWINGS

FIG. 7 is a cross-sectional view of the right-side wall assembly of FIG. 2, taken along the section line 7-7 in FIG. 6.

FIG. 8 is a partial cross-sectional view of the right-side wall assembly of FIG. 2, taken along the section line 8-8 in FIG. 6.

DETAILED DESCRIPTION

Figure 1:
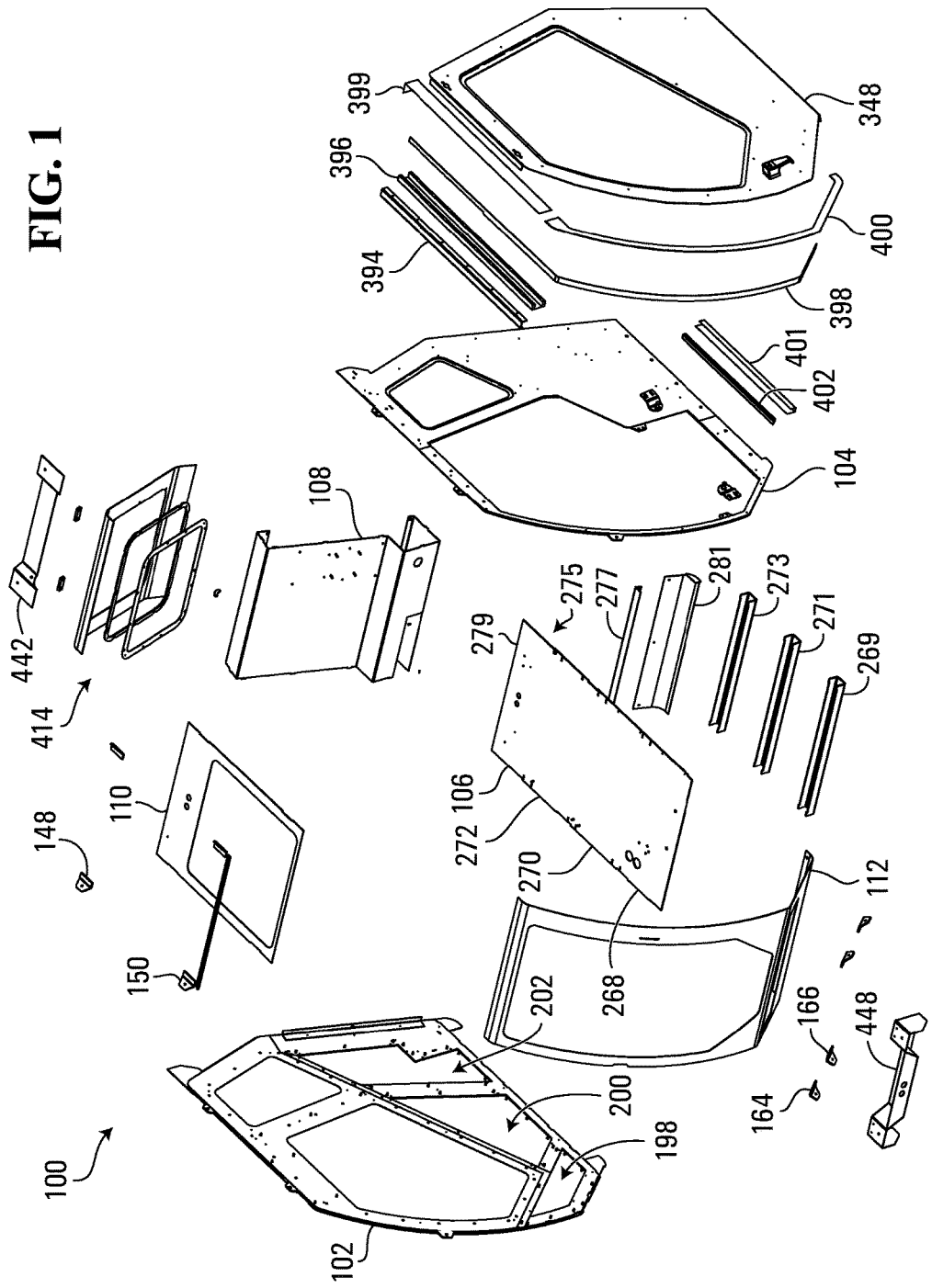
FIG. 1 is an exploded perspective view of an operator cab assembly according to an embodiment.

Referring to FIG. 1, an operator cab assembly according to an embodiment is shown generally at 100 and includes a right-side (or "first") wall assembly 102, a left-side (or "second") wall assembly 104, a floor body 106, a rear wall body 108, a ceiling body 110, and a front wall body 112.

Figure 2:
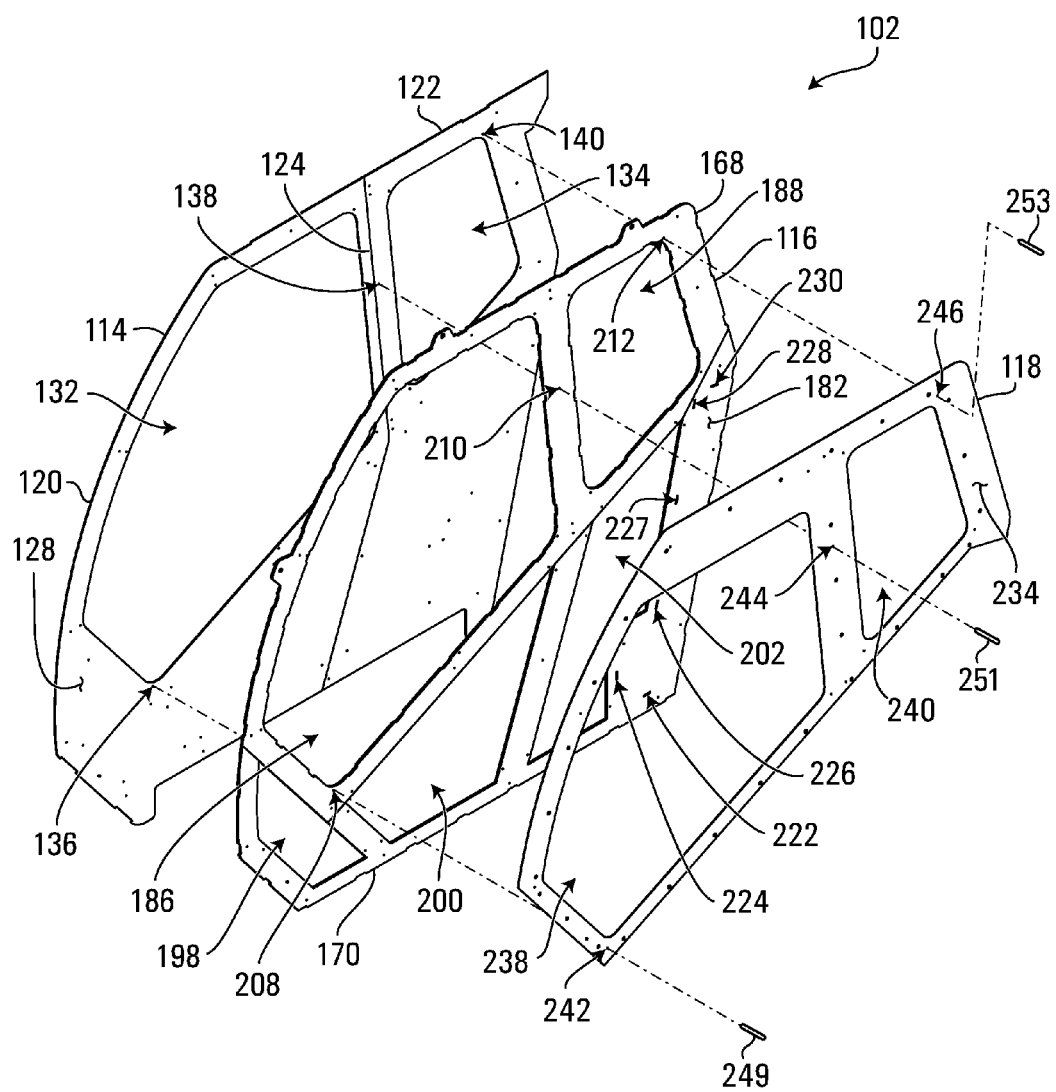
FIG. 2 is an exploded perspective view of a right-side wall assembly of the operator cab assembly of FIG. 1.
Figure 3:
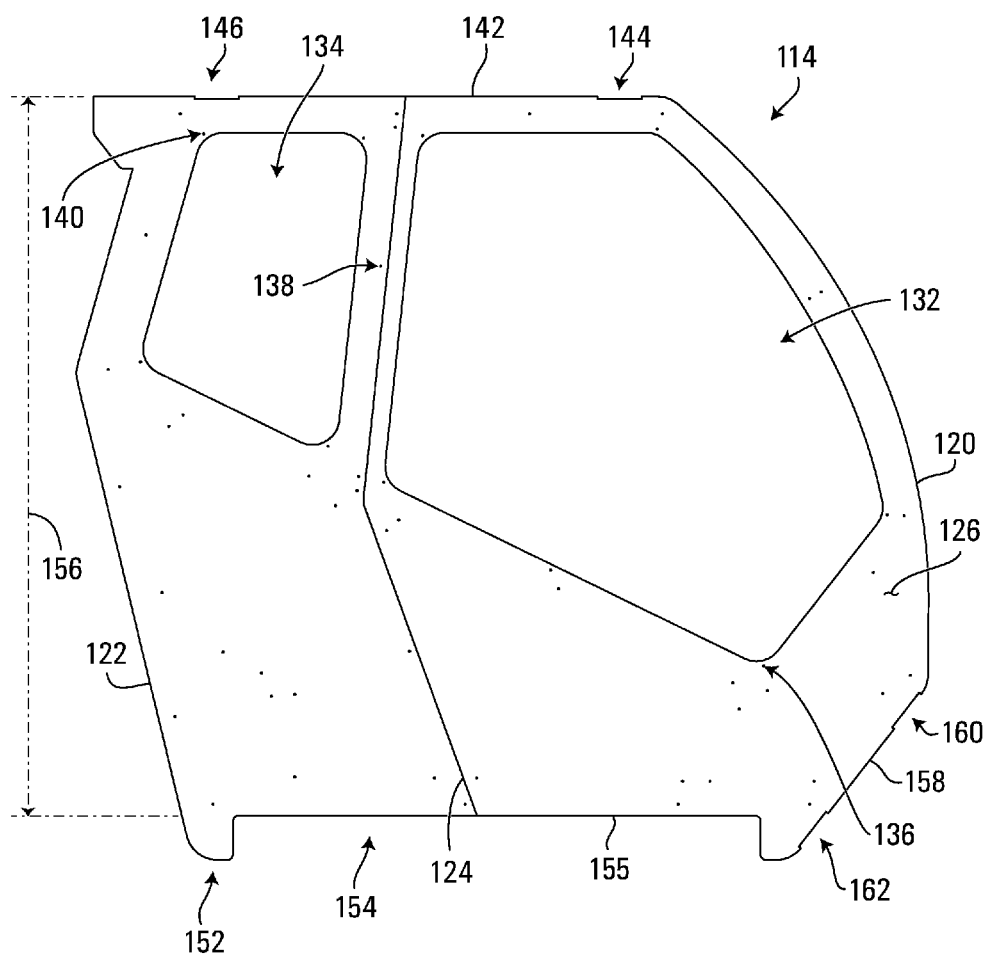
FIG. 3 is a side view of a sheet-metal exterior wall body of the right-side wall assembly of FIG. 2.

Referring to FIGS. 2 and 3, the right-side wall assembly 102 includes a sheet-metal exterior wall body 114, a sheet-metal structural wall body 116, and a sheet-metal interior wall body 118. The sheet-metal exterior wall body 114 in the embodiment shown includes a front sheet-metal portion 120 and a rear sheet-metal portion 122, fastened to each other at a seam 124 by butt welding for example. In alternative embodiments, the sheet-metal exterior wall body 114 may be formed from a single unitary sheet-metal body or from more than two sheet-metal portions, for example. Further, although the front sheet-metal portion 120 and the rear sheet-metal portion 122 are fastened together by welding in the embodiment shown, alternative embodiments may include sheet-metal portions fastened to each other in other ways, or fastened to each other only by being fastened to the sheet-metal structural wall body 116 and to the sheet-metal interior wall body 118 as described below for example.

The front sheet-metal portion 120 and the rear sheet-metal portion 122 are generally coplanar and define a generally planar outer surface 126 and a generally planar inner surface 128 opposite the generally planar outer surface 126. In this context, "generally planar" refers to a surface of a sheet-metal portion that may not be perfectly planar, but that may function substantially similar to a planar surface of a sheet-metal portion, and "generally coplanar" refers to sheet-metal portions that may not be perfectly coplanar, but that have exterior surfaces that may function substantially similar to coplanar sheet-metal portions. More generally, "generally" herein contemplates variations that may or may not be described herein and that may function substantially similar to those described herein.

In the embodiment shown, the front sheet-metal portion 120 and the rear sheet-metal portion 122 are made from 11-gauge carbon steel, so the sheet-metal exterior wall body 114 has a thickness 130 (shown in FIG. 7) of about 3.0 millimeters ("mm") between the generally planar outer surface 126 and the generally planar inner surface 128. However, in alternative embodiments, the sheet-metal exterior wall body 114 may be made from different materials (such as aluminum or stainless steel, for example) and may have different thicknesses, such as a thickness from about 2 mm to about 4 mm for example. The front sheet-metal portion 120 and the rear sheet-metal portion 122, and more generally the sheet-metal portions and bodies described herein, may be formed by laser cutting standard sheets of metal.

The front sheet-metal portion 120 defines a window opening shown generally at 132 and extending between the generally planar outer surface 126 and the generally planar inner surface 128, and the rear sheet-metal portion 122 defines another window opening shown generally at 134 and extending between the generally planar outer surface 126 and the generally planar inner surface 128. The sheet-metal exterior wall body 114 thus defines two window openings 132 and 134, but the sheet-metal exterior wall body 114 may more generally be described as defining "a window opening" because a body defining two (or more) window openings still defines "a window opening". More generally, unless the context clearly specifies otherwise, reference to a singular ("a window opening" for example) includes the singular and the plural. The window opening 132 and the window opening 134 are sized to receive respective windows as described below. In general, the various window openings and windows described herein may allow for high visibility around and above an operator seat 462 (shown in FIG. 23).

The sheet-metal exterior wall body 114 also defines a plurality of alignment holes (such as the alignment holes shown generally at 136, 138, and 140 for example) extending between the generally planar outer surface 126 and the generally planar inner surface 128. In the embodiment shown, the alignment holes in the sheet-metal exterior wall body 114 have a diameter of about 0.125 inches (or about 3.2 mm), although alignment holes in alternative embodiments may have other diameters.

Figure 24:
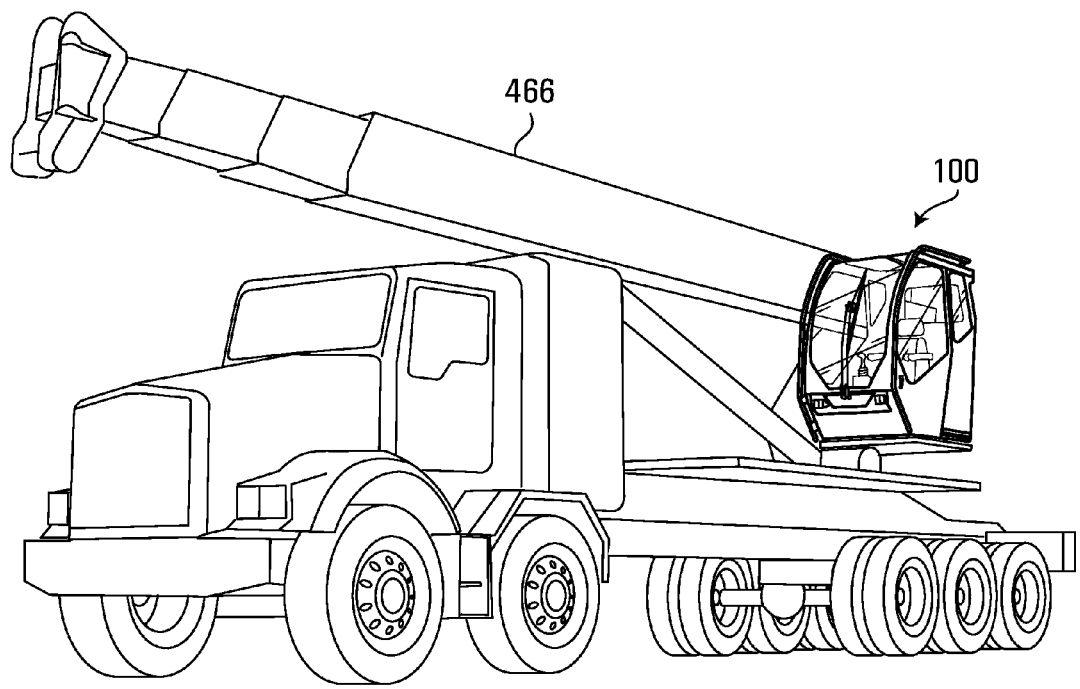
FIG. 24 is a perspective view of the operator cab assembly of FIG. 1, installed on a crane.

The sheet-metal exterior wall body 114 has an upper edge 142, which defines a generally vertical recess shown generally at 144 and another generally vertical recess shown generally at 146. The recess 144 and the recess 146 receive respective portions of handrail mounting brackets 148 and 150 (shown in FIG. 1). Also, on a bottom side shown generally at 152, the sheet-metal exterior wall body 114 defines a cutout shown generally at 154 to receive mounting members (not shown) of equipment such as a crane to mount the operator cab assembly 100 to such equipment as shown in FIG. 24 for example. From an upper edge 155 of the cutout 154 to the upper edge 142, the sheet-metal exterior wall body 114 has an overall height 156, which may be about 67 inches or about 170 centimeters ("cm") for example. Also, on a lower front edge 158, the sheet-metal exterior wall body 114 defines a recess shown generally at 160 and a recess shown generally at 162, which receive respective portions of handrail mounting brackets 164 and 166 (shown in FIG. 1).

Figure 4:
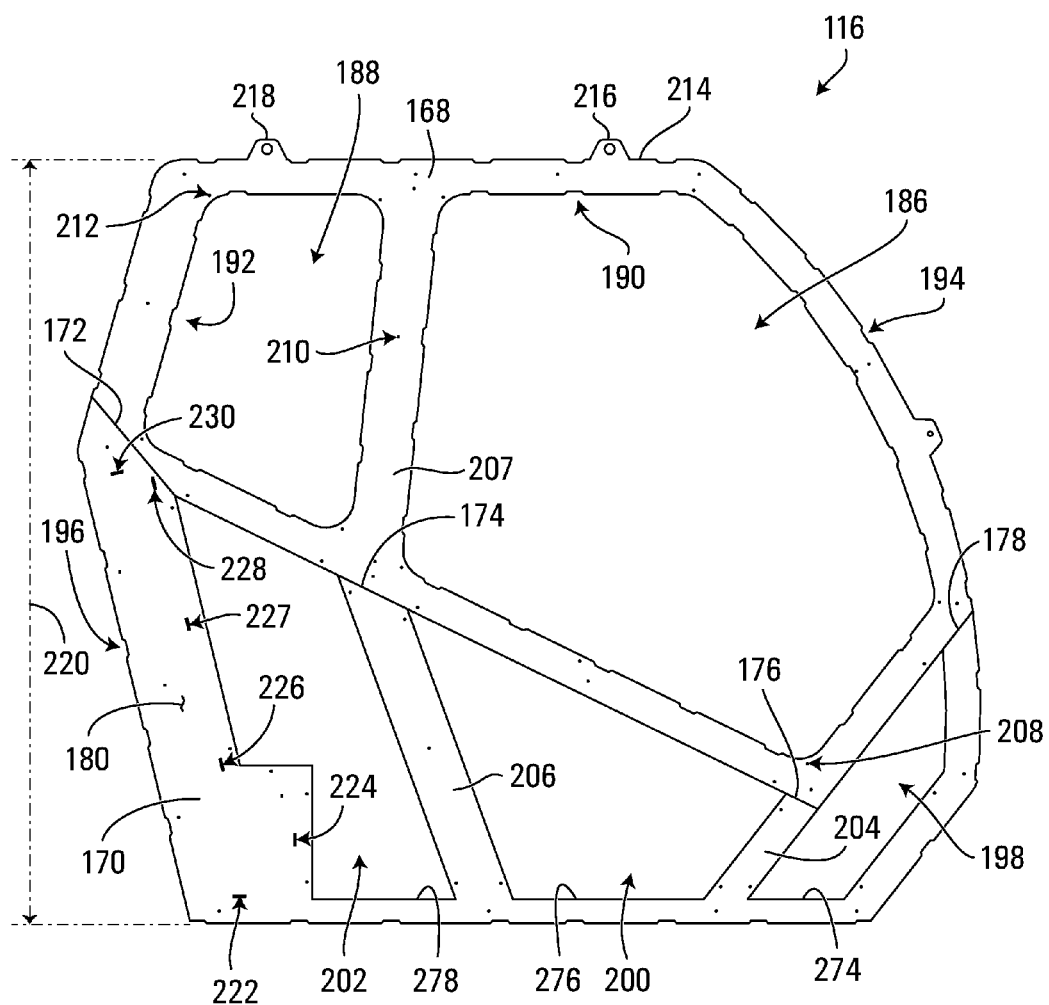
FIG. 4 is a side view of a sheet-metal structural wall body of the right-side wall assembly of FIG. 2.

Referring to FIGS. 2 and 4, the sheet-metal structural wall body 116 in the embodiment shown includes an upper sheet-metal portion 168 and a lower sheet-metal portion 170, fastened to each other at seams 172, 174, 176, and 178 by butt welding for example. In alternative embodiments, the sheet-metal structural wall body 116 may be formed from a single unitary sheet-metal body or from more than two sheet-metal portions, for example. Further, although the upper sheet-metal portion 168 and the lower sheet-metal portion 170 are fastened together by welding in the embodiment shown, alternative embodiments may include sheet-metal portions fastened to each other in other ways, or fastened to each other only by being fastened to the sheet-metal exterior wall body 114 and to the sheet-metal interior wall body 118 as described below for example.

The upper sheet-metal portion 168 and the lower sheet-metal portion 170 are generally coplanar and define a generally planar outer surface 180 and a generally planar inner surface 182 opposite the generally planar outer surface 180. In the embodiment shown, the upper sheet-metal portion 168 and the lower sheet-metal portion 170 are made from quarter-inch carbon steel, so the sheet-metal structural wall body 116 has a thickness 184 (shown in FIG. 7) of about 6.4 mm between the generally planar outer surface 180 and the generally planar inner surface 182. However, in alternative embodiments, the sheet-metal structural wall body 116 may be made from different materials (such as aluminum or stainless steel, for example) and may have different thicknesses, such as a thickness from about 5 mm to about 7 mm for example.

The upper sheet-metal portion 168 defines a window opening shown generally at 186 and extending between the generally planar outer surface 180 and the generally planar inner surface 182, and the upper sheet-metal portion 168 also defines a window opening shown generally at 188 and extending between the generally planar outer surface 180 and the generally planar inner surface 182. The window opening 186 and the window opening 188 are sized to receive respective windows as described below. Further, the window opening 186 has the same size and shape as the window opening 132 (shown in FIGS. 2 and 3), and the window opening 188 has the same size and shape as the window opening 134 (also shown in FIGS. 2 and 3), except that edges of the sheet-metal structural wall body 116 defining the window openings 186 and 188 define a plurality of recesses, such as the recesses shown generally at 190 and 192 for example. Further, outer edges of the sheet-metal structural wall body 116 also define a plurality of recesses, such as the recesses shown generally at 194 and 196 for example. Recesses (such as the recesses 190, 192, 194, and 196 for example) in edges of the sheet-metal structural wall body 116 are about 6 inches to about 8 inches (or about 15 cm to about 20 cm) apart from each other in the embodiment shown, and may facilitate fastening the generally planar inner surface 128 of the sheet-metal exterior wall body 114 to the generally planar outer surface 180 of the sheet-metal structural wall body 116 as described below.

The lower sheet-metal portion 170 defines weight-reducing openings shown generally at 198, 200, and 202, each extending between the generally planar outer surface 180 and the generally planar inner surface 182. The weight-reducing openings 198, 200, and 202 reduce an overall weight of the sheet-metal structural wall body 116 while maintaining structural strength. For example, a structural member 204 between the weight-reducing openings 198 and 200, and a structural member 206 between the weight-reducing openings 200 and 202, may provide structural support to the sheet-metal structural wall body 116, and more generally to the operator cab assembly 100. For example, the structural members 204 and 206 support weight of the upper sheet-metal portion 168, weight of the ceiling body 110 as described below, and weight of windows received in the window openings 186 and 188 as described below. Further, as shown in FIG. 4, the structural member 206 supports a structural member 207 between the window openings 186 and 188, so the structural member 206 and the structural member 207 together may facilitate transferring loads from the top side of the operator cab assembly 100 to bottom side the operator cab assembly 100. As such, the sheet-metal structural wall body 116 may provide structural support to the operator cab assembly 100 at less weight than may be required in embodiments that do not include weight-reducing openings such as the weight-reducing openings 198, 200, and 202 in the embodiment shown.

The sheet-metal structural wall body 116 also defines a plurality of alignment holes (such as the alignment holes shown generally at 208, 210, and 212 for example) extending between the generally planar outer surface 180 and the generally planar inner surface 182. In the embodiment shown, the alignment holes in the sheet-metal structural wall body 116 have a diameter of about 0.125 inches (or about 3.2 mm), although alignment holes in alternative embodiments may have other diameters. Further, the alignment holes in the sheet-metal structural wall body 116 are generally aligned with respective ones of the alignment holes in the sheet-metal exterior wall body 114 as described below. The sheet-metal structural wall body 116 also defines alignment openings shown generally at 222, 224, 226, 227, 228, and 230, which are open to the generally planar inner surface 182 for receiving complementary portions of the rear wall body 108 (shown in FIG. 1) as described below.

An upper edge 214 of the sheet-metal structural wall body 116 defines upward projections 216 and 218. Other than the upward projections 216 and 218, the sheet-metal structural wall body 116 has an overall height 220, which in the embodiment shown is about 0.375 inches (or about 9.5 mm) less than the overall height 156 of the sheet-metal exterior wall body 114 (shown in FIG. 3).

Figure 5:
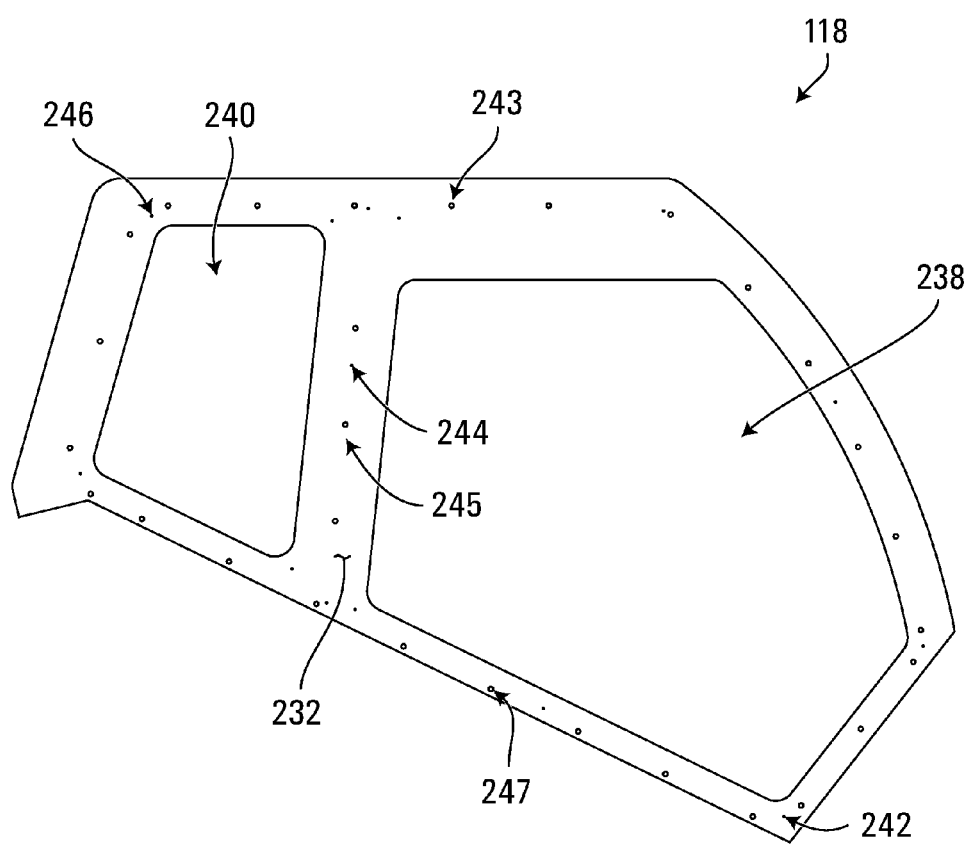
FIG. 5 is a side view of a sheet-metal interior wall body of the right-side wall assembly of FIG. 2.

Referring to FIGS. 2 and 5, the sheet-metal interior wall body 118 in the embodiment shown is made from a single unitary sheet-metal body. In alternative embodiments, the sheet-metal interior wall body 118 may include two or more sheet-metal portions. The sheet-metal interior wall body 118 defines a generally planar outer surface 232 and a generally planar inner surface 234 opposite the generally planar outer surface 232. In the embodiment shown, the sheet-metal interior wall body 118 is made from 14-gauge carbon steel, so the sheet-metal interior wall body 118 has a thickness 236 (shown in FIG. 7) of about 1.9 mm between the generally planar outer surface 232 and the generally planar inner surface 234. However, in alternative embodiments, the sheet-metal interior wall body 118 may be made from different materials (such as aluminum or stainless steel, for example) and may have different thicknesses, such as a thickness from about 1 mm to about 3 mm for example.

The sheet-metal interior wall body 118 defines a window opening shown generally at 238 and extending between the generally planar outer surface 232 and the generally planar inner surface 234, and the sheet-metal interior wall body 118 defines another window opening shown generally at 240 and extending between the generally planar outer surface 232 and the generally planar inner surface 234. The window opening 238 is aligned with but smaller than the window openings 132 and 186, and the window opening 240 is aligned with but smaller than the window openings 134 and 188. Thus, as described below, the sheet-metal interior wall body 118 may facilitate fastening a window in the window opening 186 and fastening another window in the window opening 188 of the sheet-metal structural wall body 116.

The sheet-metal interior wall body 118 defines a plurality of alignment holes (such as the alignment holes shown generally at 242, 244, and 246 for example) extending between the generally planar outer surface 232 and the generally planar inner surface 234. In the embodiment shown, the alignment holes in the sheet-metal interior wall body 118 have a diameter of about 0.125 inches (or about 3.2 mm), although alignment holes in alternative embodiments may have other diameters. Further, as described below, the alignment holes in the sheet-metal interior wall body 118 are generally aligned with respective ones of the alignment holes of the sheet-metal structural wall body 116 and with respective ones of the alignment holes of the sheet-metal exterior wall body 114.

Further, the sheet-metal interior wall body 118 defines a plurality of fastening holes (such as the fastening holes shown generally at 243, 245, and 247 for example) extending between the generally planar outer surface 232 and the generally planar inner surface 234. Fastening holes (such as the fastening holes 243, 245, and 247 for example) in the sheet-metal interior wall body 118 in the embodiment shown have diameters of about 0.375 inches (or about 9.5 mm), although fastening holes in alternative embodiments may have other diameters. Also, fastening holes (such as the fastening holes 243, 245, and 247 for example) in the sheet-metal interior wall body 118 may facilitate fastening the generally planar inner surface 182 of the sheet-metal structural wall body 116 to the generally planar outer surface 232 of the sheet-metal interior wall body 118 as described below.

Figure 6:
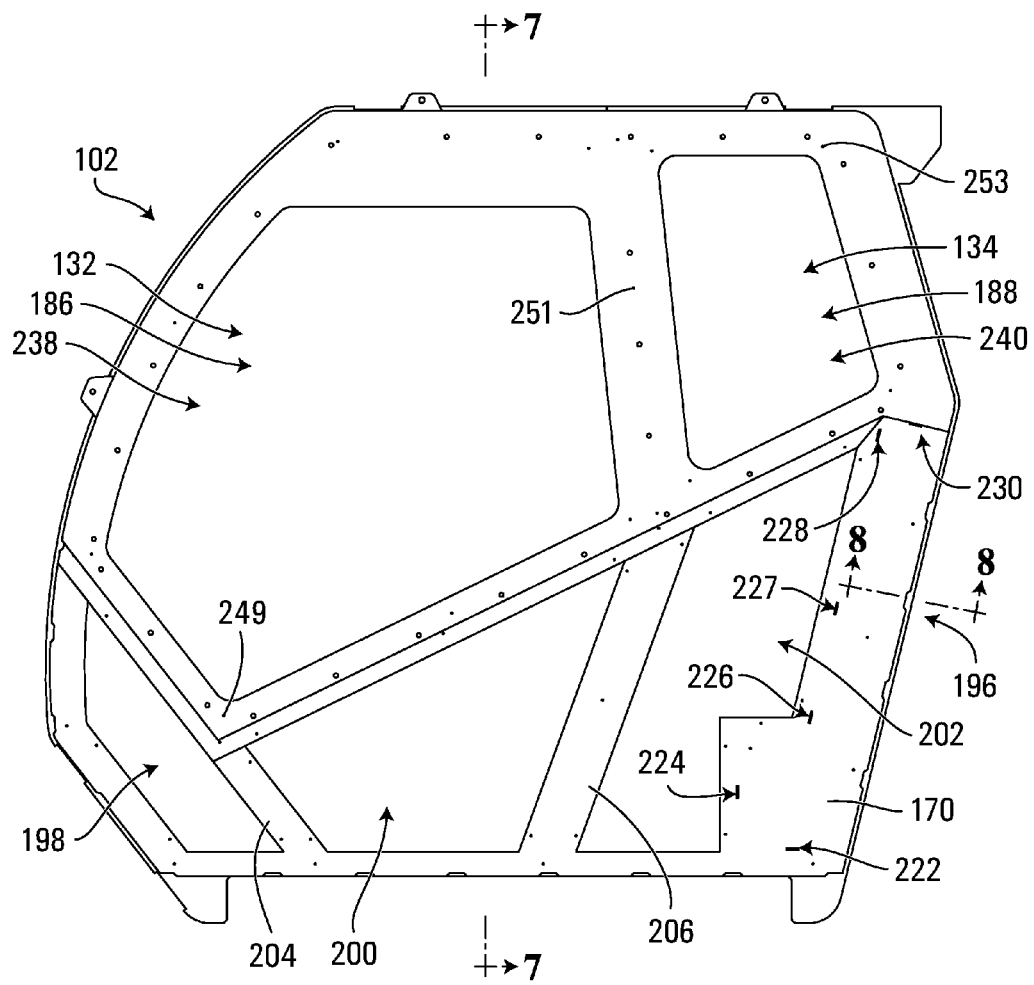
FIG. 6 is a side view of the right-side wall assembly of FIG. 2.

Referring to FIGS. 2, 6, and 7, a method of assembling the right-side wall assembly 102 involves aligning the sheet-metal exterior wall body 114 relative to the sheet-metal structural wall body 116, and aligning the sheet-metal structural wall body 116 relative to the sheet-metal interior wall body 118. As indicated above, alignment holes of the sheet-metal interior wall body 118 are aligned with respective ones of the alignment holes in the sheet-metal structural wall body 116, and with respective ones of the alignment holes in the sheet-metal exterior wall body 114. The alignment holes may be cut precisely (by laser cutting for example) to facilitate precisely aligning the sheet-metal exterior wall body 114, the sheet-metal structural wall body 116, and the sheet-metal interior wall body 118 to each other. Therefore, a plurality of fasteners (such as the fasteners 249, 251, and 253 for example) may be positioned through respective alignment holes in the sheet-metal interior wall body 118, through respective alignment holes in the sheet-metal structural wall body 116, and through respective alignment holes in the sheet-metal exterior wall body 114 to align the sheet-metal interior wall body 118, the sheet-metal structural wall body 116, and the sheet-metal exterior wall body 114 to each other. The fasteners (such as the fasteners 249, 251, and 253 for example) may include WEDGELOCK Temporary Fasteners available from Monogram Aerospace of Los Angeles, Calif., United States of America, for example.

In the embodiment shown, the alignment holes 136, 208, and 242 are aligned with each other, the alignment holes 138, 210, and 244 are aligned with each other, and the alignment holes 140, 212, and 246 are aligned with each other. Accordingly, as shown in FIGS. 2 and 6, the fastener 249 may be received in the alignment holes 136, 208, and 242, the fastener 251 may be received in the alignment holes 138, 210, and 244, and the fastener 253 may be received in the alignment holes 140, 212, and 246. As such, the fasteners 249, 251, and 253 (plus other fasteners not shown) align the sheet-metal interior wall body 118, the sheet-metal structural wall body 116, and the sheet-metal exterior wall body 114 to each other as shown in FIGS. 6 and 7, and when thus aligned, the window opening 132 is aligned with the window opening 186 and with the window opening 238 as shown in FIG. 7, and further the window opening 134 is aligned with the window opening 188 and with the window opening 240. Herein, two or more window openings may be "aligned" if the window openings collectively define a space in which a window may be received, and if the window openings permit light that passes through a window received in the space to pass through the window openings.

Figure 16:
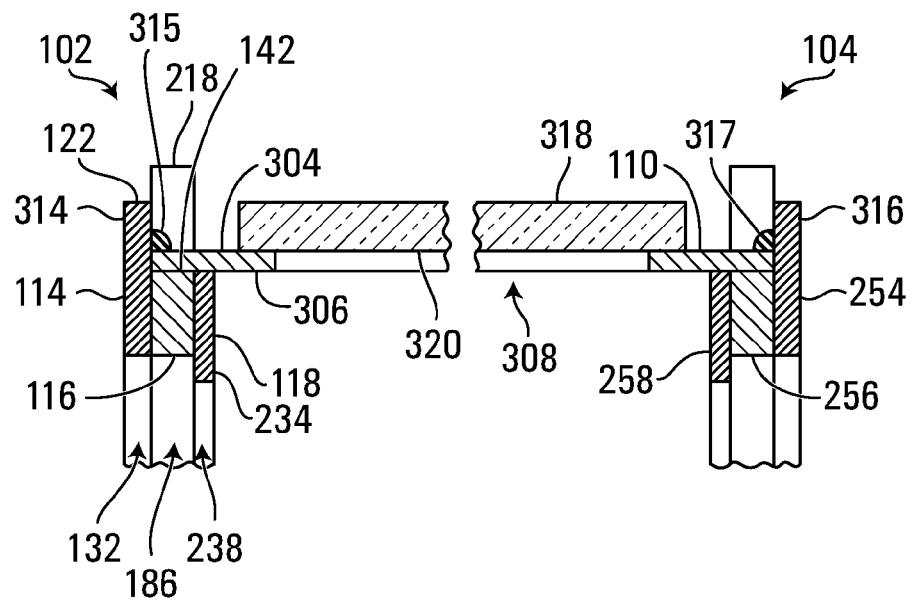
FIG. 16 is a cross-sectional view of the partially assembled operator cab assembly of FIG. 15, taken along the section line 16-16 in FIG. 15.
Figure 17:
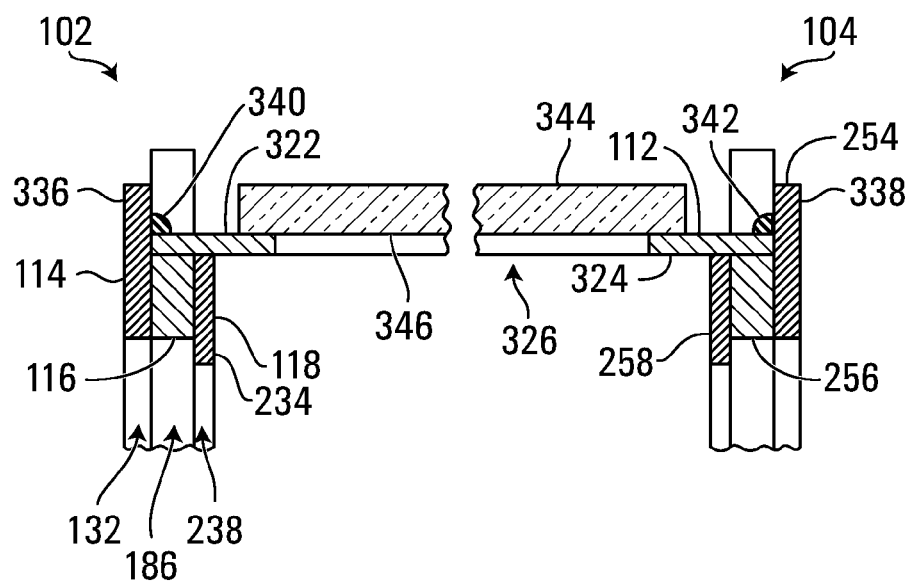
FIG. 17 is another cross-sectional view of the partially assembled operator cab assembly of FIG. 15, taken along the section line 17-17 in FIG. 15

More generally, the alignment holes align edges of the sheet-metal exterior wall body 114, of the sheet-metal structural wall body 116, and of the sheet-metal interior wall body 118. For example, in the embodiment shown, when the sheet-metal exterior wall body 114, the sheet-metal structural wall body 116, and the sheet-metal interior wall body 118 are aligned, outer edges of the sheet-metal structural wall body 116 and the sheet-metal interior wall body 118 are generally contiguous to contact the ceiling body 110 (as shown in FIG. 16) and to contact the front wall body 112 (as shown in FIG. 17). Further, as shown in FIG. 6, when the sheet-metal exterior wall body 114, the sheet-metal structural wall body 116, and the sheet-metal interior wall body 118 are aligned, the sheet-metal exterior wall body 114 covers the weight-reducing openings 198, 200, and 202 so that the weight-reducing openings 198, 200, and 202 are not open to, or apparent from, an exterior of the operator cab assembly 100.

As indicated above, the window opening 238 is smaller than the window openings 132 and 186. Therefore, as shown in FIG. 7, a portion 255 of the generally planar outer surface 232 faces into the window opening 186, and a window 257 received in the window opening 186 may be fastened to the portion 255 of the generally planar outer surface 232, for example by adhering a peripheral portion of a generally planar inner surface 259 of the window 257 to the portion 255. Fastening of the window 257 is mentioned now for convenience, but in general, windows may be fastened at the end of the assembly method to prevent damaging the windows during other steps in the assembly method. Likewise, a window (not shown) may be received in the window opening 188 and fastened to the generally planar outer surface 232 of the sheet-metal interior wall body 118.

When the sheet-metal interior wall body 118 is thus aligned to the sheet-metal structural wall body 116 and to the sheet-metal exterior wall body 114, the method of assembling the right-side wall assembly 102 further involves fastening the generally planar inner surface 128 of the sheet-metal exterior wall body 114 to the generally planar outer surface 180 of the sheet-metal structural wall body 116, and fastening the generally planar inner surface 182 of the sheet-metal structural wall body 116 to the generally planar outer surface 232 of the sheet-metal interior wall body 118.

Fastening the generally planar inner surface 128 of the sheet-metal exterior wall body 114 to the generally planar outer surface 180 of the sheet-metal structural wall body 116 may involve fillet welding generally transverse edges (namely edges extending between the generally planar outer surface 180 and the generally planar inner surface 182) of the sheet-metal structural wall body 116 to the generally planar inner surface 128 of the sheet-metal exterior wall body 114. Examples of such fillet welds in the weight-reducing opening 200 include the fillet welds 248 and 250 (shown in FIG. 7). Further, such fillet welds may be positioned in recesses (such as the recesses 190, 192, 194, and 196 shown in FIG. 4 for example) in edges of the sheet-metal structural wall body 116, and such a fillet weld 252 in the recess 196 is shown in FIG. 8.

Fastening the generally planar inner surface 182 of the sheet-metal structural wall body 116 to the generally planar outer surface 232 of the sheet-metal interior wall body 118 may involve plug-welding in the fastening holes (such as the fastening holes shown generally at 243, 245, and 247 for example) in the sheet-metal interior wall body 118.

Further, fastening the generally planar inner surface 128 of the sheet-metal exterior wall body 114 to the generally planar outer surface 180 of the sheet-metal structural wall body 116, and fastening the generally planar inner surface 182 of the sheet-metal structural wall body 116 to the generally planar outer surface 232 of the sheet-metal interior wall body 118, may involve plug-welding the alignment holes (such as the alignment holes 136, 138, 140, 208, 210, 212, 242, 244, and 246, for example) after the fasteners (such as the fasteners 249, 251, and 253, for example) are removed from the alignment holes in order to fill the alignment holes.

Figure 9:
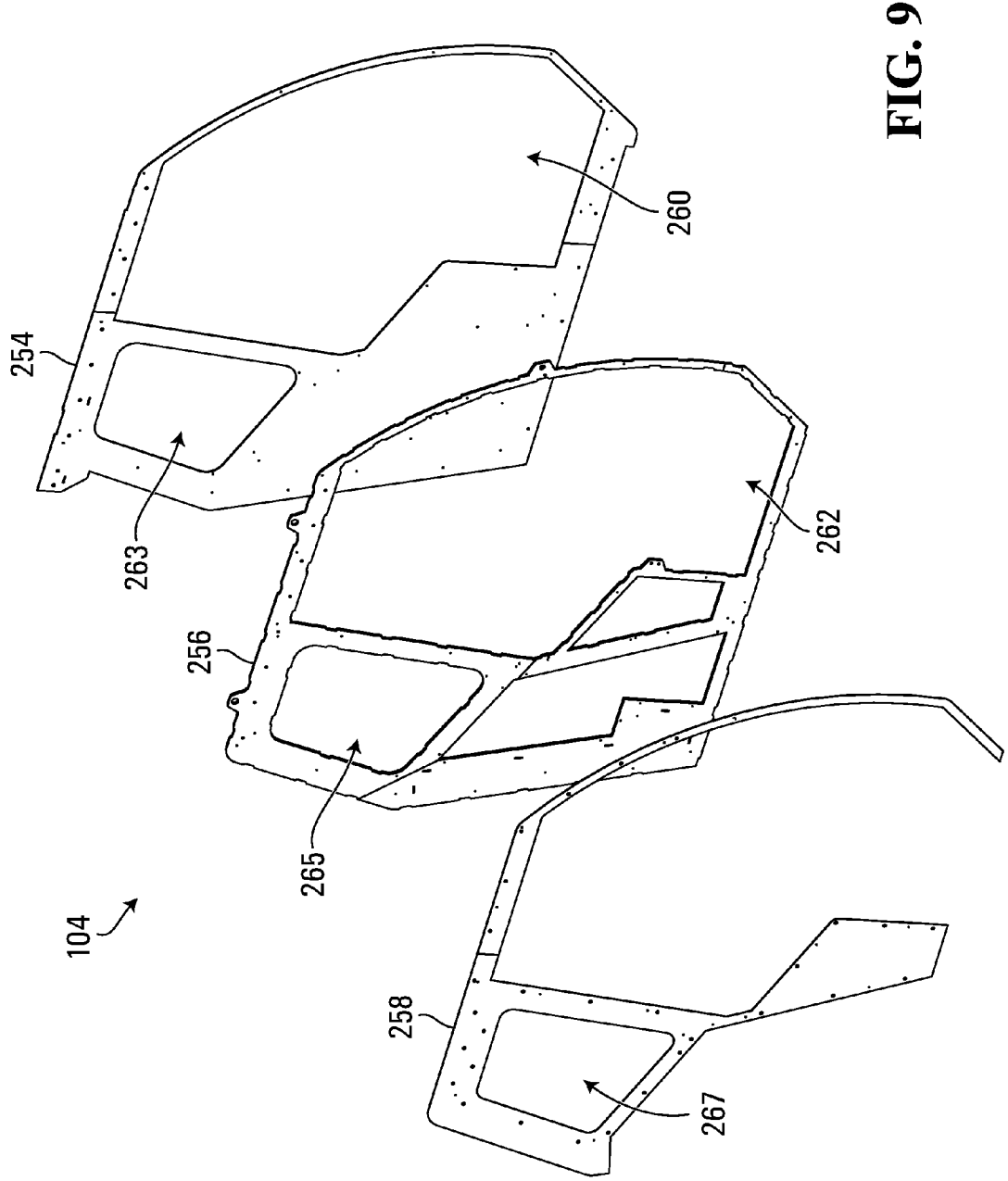
FIG. 9 is an exploded perspective view of a left-side wall assembly of the operator cab assembly of FIG. 1.
Figure 10:
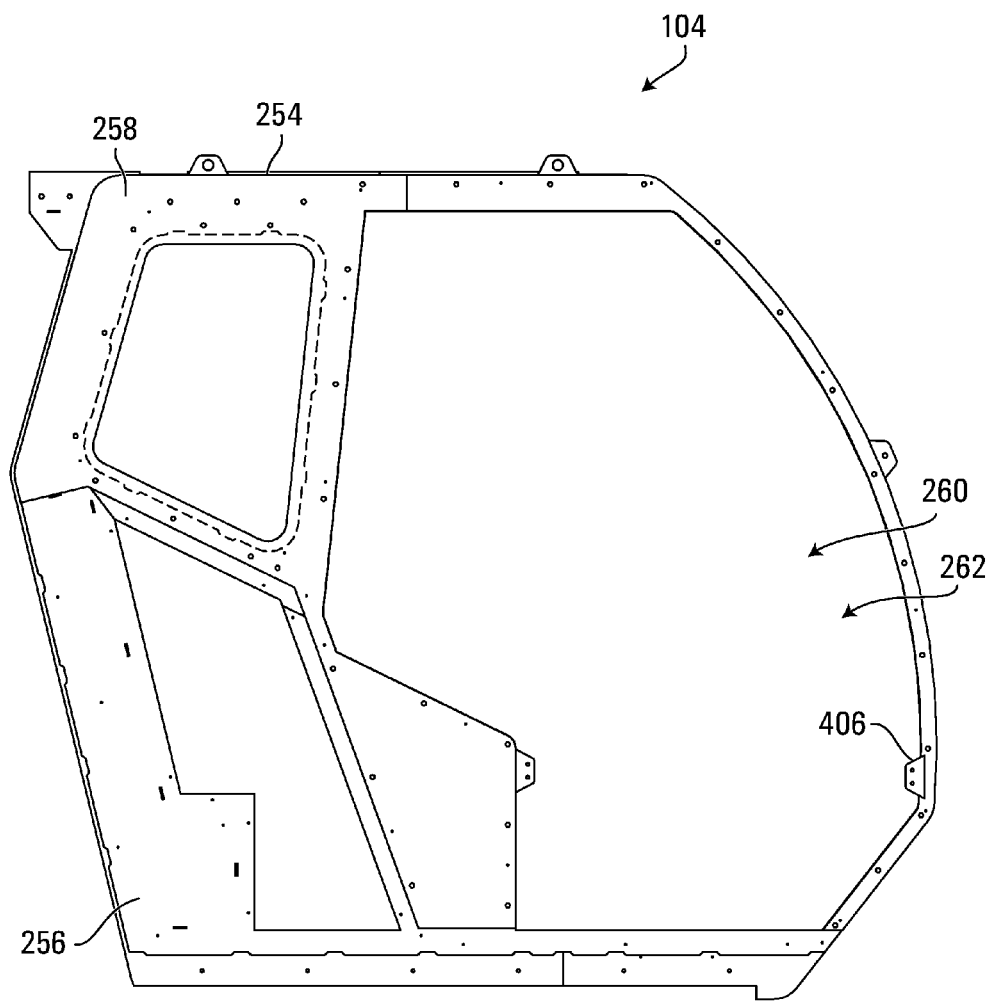
FIG. 10 is a side view of the left-side wall assembly of FIG. 9.

Referring to FIGS. 9 and 10, the left-side wall assembly 104 includes a sheet-metal exterior wall body 254, a sheet-metal structural wall body 256, and a sheet-metal interior wall body 258. The left-side wall assembly 104 is substantially the same as the right-side wall assembly 102, except that the sheet-metal exterior wall body 114 defines a door opening shown generally at 260 and the sheet-metal structural wall body 256 defines a door opening 262 that is aligned with the door opening 260 when the left-side wall assembly 104 is assembled as shown in FIG. 10. Herein, two or more door openings may be "aligned" if the door openings collectively define a passage when not covered by a door. Further, the sheet-metal exterior wall body 254 defines a window opening shown generally at 263, the sheet-metal structural wall body 256 defines a window opening shown generally at 265, and the sheet-metal interior wall body 258 defines a window opening shown generally at 267, and as described above, the window openings 263, 265, and 267 are aligned with each other, and a window (not shown) may be received in the window opening 265 and fastened to a generally planar outer surface of the sheet-metal interior wall body 258. Again, fastening of a window in the window opening 265 is mentioned now for convenience, but in general, windows may be fastened at the end of the assembly method to prevent damaging the windows during other steps in the assembly method.

Figure 11:
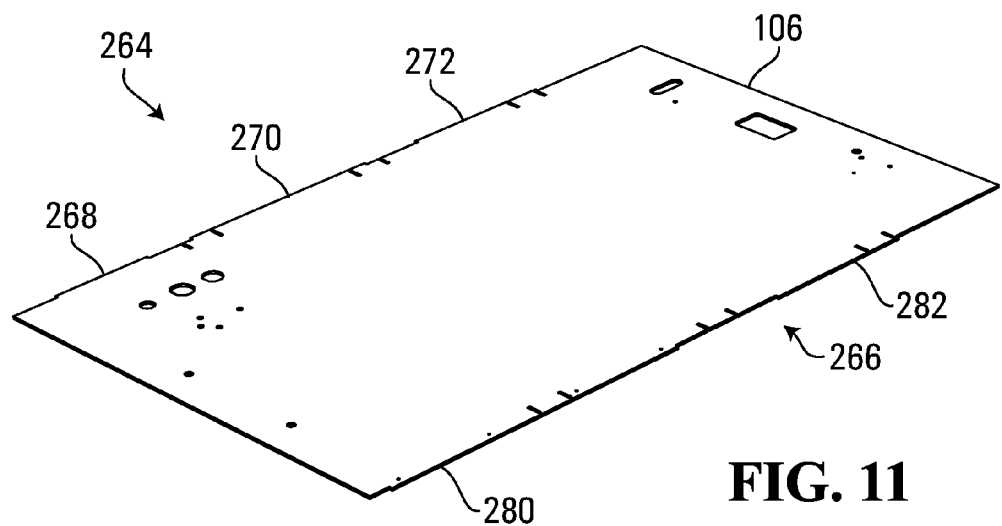
FIG. 11 is a perspective view of a floor body of the operator cab assembly of FIG. 1.

Referring to FIG. 11, the floor body 106 is made from a flat sheet-metal body having a right side shown generally at 264 and a left side shown generally at 266. The right side 264 includes projections 268, 270, and 272. Referring to FIGS. 4 and 11, the projection 268 is sized to be received within the weight-reducing opening 198 of the sheet-metal structural wall body 116 when the projection 268 rests against a lower edge 274 of the weight-reducing opening 198, the projection 270 is sized to be received in the weight-reducing opening 200 of the sheet-metal structural wall body 116 when the projection 270 rests against a lower edge 276 of the weight-reducing opening 200, and the projection 272 is sized to be received in the weight-opening 202 of the sheet-metal structural wall body 116 when the projection 272 rests on a lower edge 278 of the weight-reducing opening 202. Similarly, on the left side 266, the floor body 106 defines projections 280 and 282 sized to be received in openings of the sheet-metal structural wall body 256 (shown in FIGS. 9 and 10) when resting against similar lower edges of such opening. As shown in FIG. 1, mounting struts 269, 271, and 273 may be fastened to a bottom side shown generally at 275 of the floor body 106. Further, a bracket 277 may be fastened to a rear edge 279 of the floor body 106. The bracket 277 is removably attachable to a panel 281 to allow the panel 281 to enclose removably a space under the floor body 106.

Figure 12:
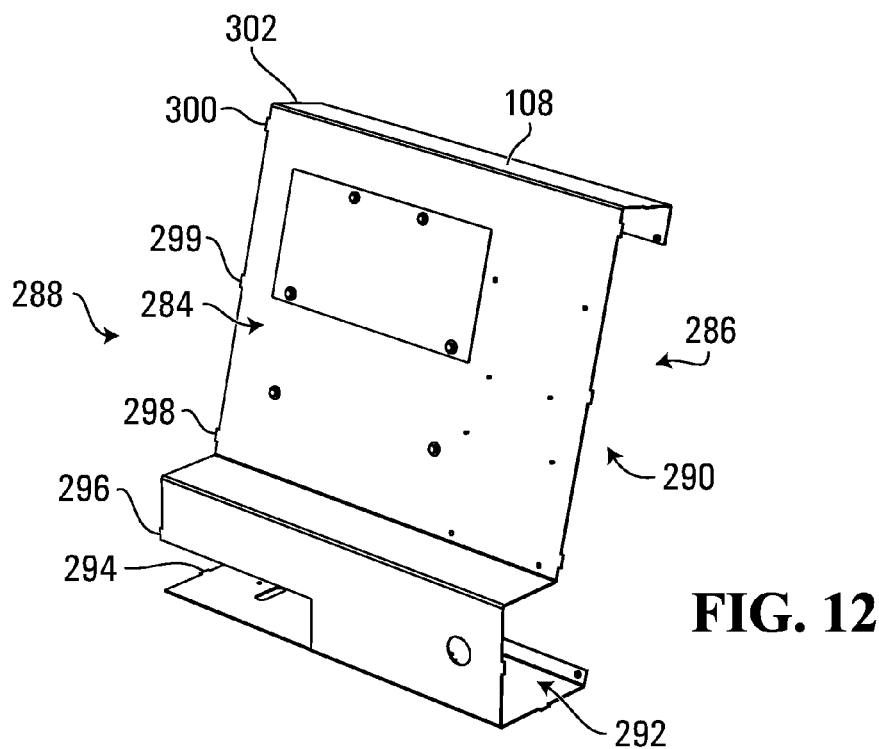
FIG. 12 is a perspective view of a rear wall body of the operator cab assembly of FIG. 1.

Referring to FIG. 12, the rear wall body 108 is made from a piece of sheet metal having a front side shown generally at 284, a rear side shown generally at 286 and opposite the front side 284, a right side shown generally at 288, and a left side shown generally at 290 and opposite the right side 288. The rear wall body 108 is made from a sheet-metal body and bent to define a receptacle shown generally at 292 and open towards the rear side 286 to receive a heater (not shown) or an air conditioner (not shown), or both, for operator comfort, for example, from the rear side 286. The rear wall body 108, and more generally the bent sheet-metal portions and bodies described herein, may be bent (or formed) using a programmable bending brake, for example. On the right side 288, the rear wall body 108 defines projections 294, 296, 298, 299, 300, and 302, which are positioned and sized to be received in the openings 222, 224, 226, 227, 228, and 230 (shown in FIG. 6 for example) respectively to facilitate aligning and fastening the rear wall body 108 to the sheet-metal structural wall body 116 and to the right-side wall assembly 102. On the left side 290, the rear wall body 108 also defines projections that are positioned and sized to be received in respective complementary openings in the sheet-metal structural wall body 256 to facilitate aligning and fastening the rear wall body 108 to the sheet-metal structural wall body 256 and to the left-side wall assembly 104.

Figure 13:
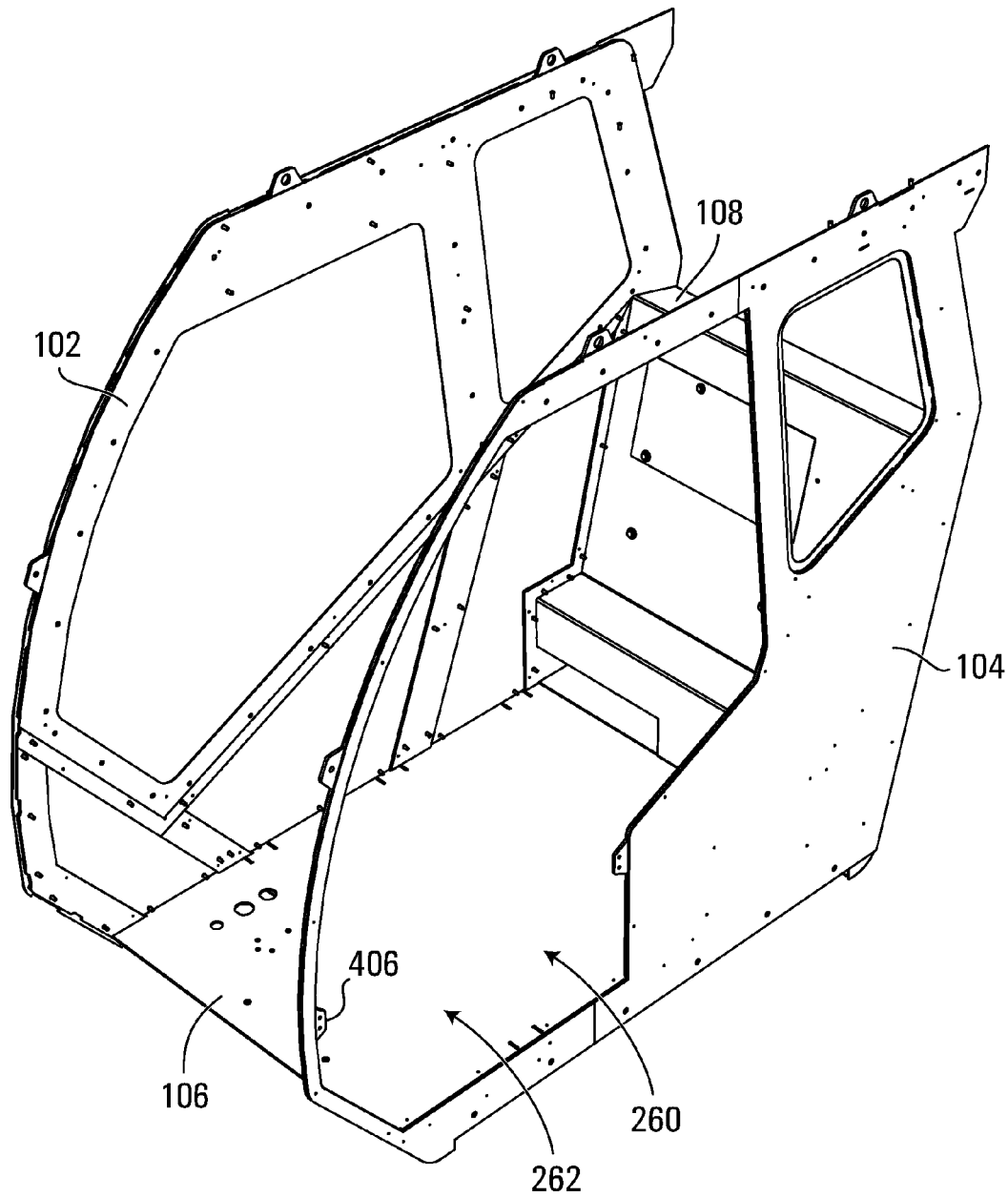
FIG. 13 is a partially assembled perspective view of the operator cab assembly of FIG. 1.

FIG. 13 illustrates the right-side wall assembly 102 and the left-side wall assembly 104 assembled as described above. In one embodiment, after the right-side wall assembly 102 and the left-side wall assembly 104 are assembled, the right-side wall assembly 102 is first fastened (by welding, for example) to the floor body 106 and then to the rear wall body 108, and then the left-side wall assembly 104 is fastened (by welding, for example) to the floor body 106 and to the rear wall body 108. Then a rear wall assembly 414 may be fastened (by welding, for example) to the right-side wall assembly 102 and to the left-side wall assembly 104, although in other embodiments the parts may be assembled in different orders. Therefore, the rear wall body 108 and the rear wall assembly 414 may individually or collectively be referred to as a "rear wall body".

Figure 22:
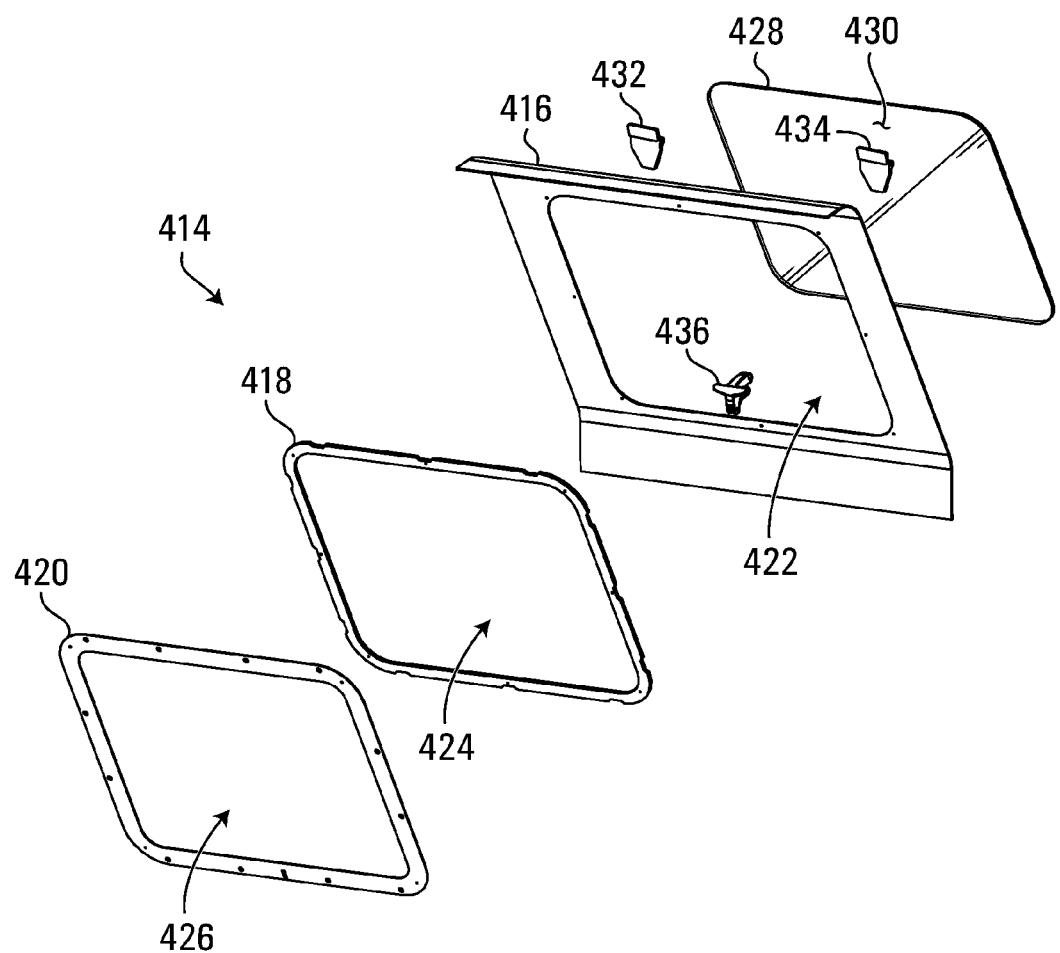
FIG. 22 is an exploded perspective view of a rear wall assembly of the operator cab assembly of FIG. 1.

Referring to FIGS. 1 and 22, the rear wall assembly is shown generally at 414 and includes an exterior sheet-metal body 416, a sheet-metal spacer 418, and an interior sheet-metal body 420. The exterior sheet-metal body 416 defines a window opening shown generally at 422, the sheet-metal spacer 418 defines a window opening shown generally at 424 and aligned with the window opening 422, and the interior sheet-metal body 420 defines a window opening shown generally at 426 and aligned with the window opening 422 and with the window opening 424. The window openings 422 and 424 are sized to receive a window 428, but the window opening 426 is smaller than the window openings 422 and 424. Therefore, when the rear wall assembly 414 is assembled with a generally planar inner surface of the exterior sheet-metal body 416 fastened to a generally planar outer surface of the sheet-metal spacer 418 and with a generally planar inner surface of the sheet-metal spacer 418 fastened to a generally planar outer surface of the interior sheet-metal body 420 generally as described above, the window 428 may be received in the window openings 422 and 424, but a peripheral portion of a generally planar inner surface 430 of the window 428 may contact a bubble-rubber gasket (not shown) on a peripheral portion of the generally planar outer surface of the interior sheet-metal body 420 surrounding the window opening 426. Hinges 432 and 434 may hingedly fasten the window 428 to an outer surface of the exterior sheet-metal body 416, and a latch 436 allows the window 428 to be opened and closed by pivoting the window 428 around hinge axes of the hinges 432 and 434.

In one embodiment, after the rear wall assembly 414 is fastened to the right-side wall assembly 102 and to the left-side wall assembly 104, the ceiling body 110 may be fastened (by welding, for example) to the right-side wall assembly 102 and to the left-side wall assembly 104, and then the front wall body 112 may be fastened (by welding, for example) to the right-side wall assembly 102, to the left-side wall assembly 104, and to the floor body 106, although as indicated above the parts may be assembled in different orders in other embodiments.

Figure 14:
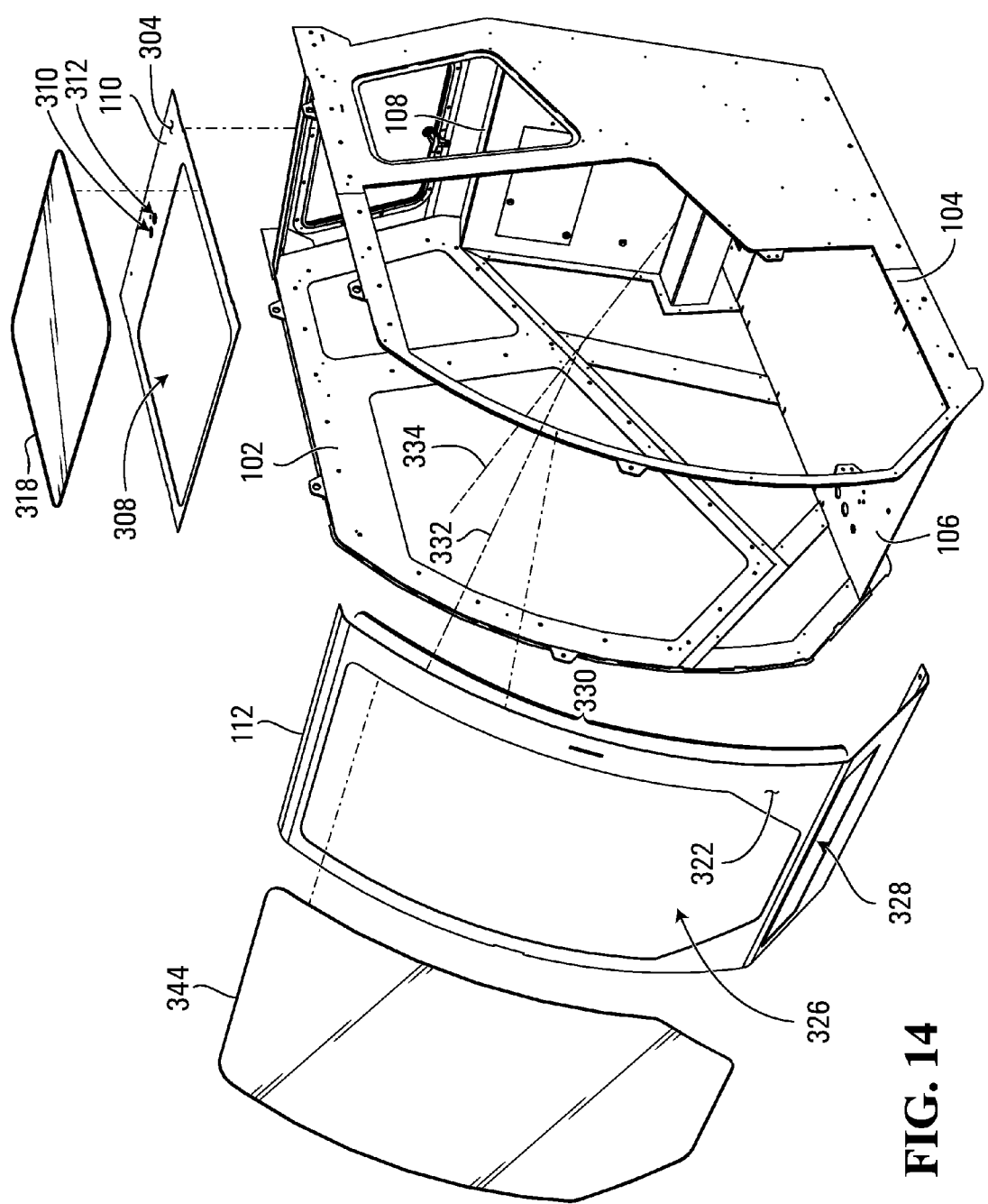
FIG. 14 is another partially assembled perspective view of the operator cab assembly of FIG. 1.
Figure 15:
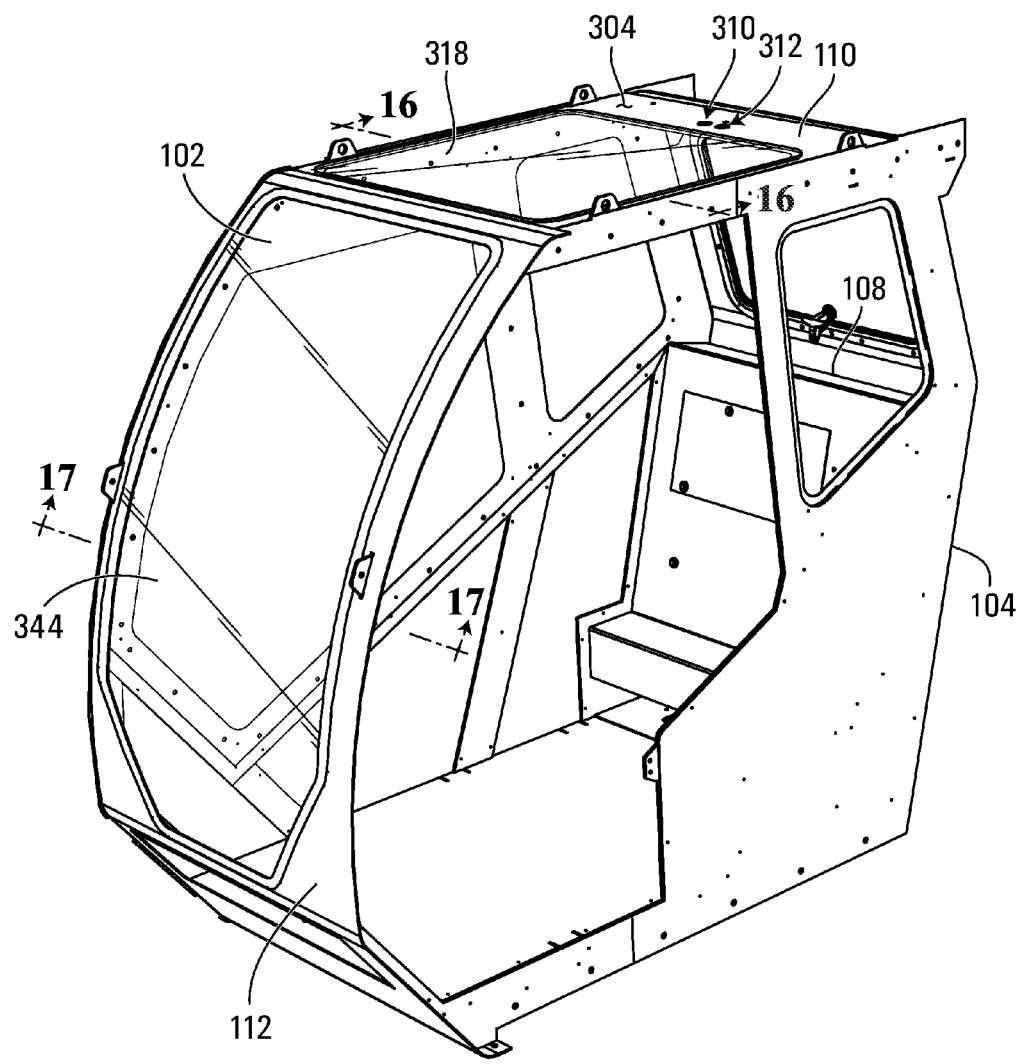
FIG. 15 is another partially assembled perspective view of the operator cab assembly of FIG. 1.

Referring to FIGS. 14 to 16, the ceiling body 110 is made from a flat sheet-metal body having a generally planar outer surface 304 and a generally planar inner surface 306 opposite the generally planar outer surface 304. Between the generally planar outer surface 304 and the generally planar inner surface 306, the ceiling body 110 defines a window opening shown generally at 308 and wiper shaft openings 310 and 312 for receiving wiper shafts as described below.

As indicated above, the overall height 220 of the sheet-metal structural wall body 116 is about 0.375 inches (or about 9.5 mm) less than the overall height 156 of the sheet-metal exterior wall body 114. Therefore, as shown in FIG. 16, a portion 314 of the sheet-metal exterior wall body 114 extends about 0.375 inches (or about 9.5 mm) above the upper edge 142 of the sheet-metal structural wall body 116. Likewise, a portion 316 of the sheet-metal exterior wall body 254 extends about 0.375 inches (or about 9.5 mm) above an upper edge of the sheet-metal structural wall body 256. Therefore, as shown in FIGS. 15 and 16, the ceiling body 110 may be positioned between the portion 314 of the sheet-metal exterior wall body 114 and the portion 316 of the sheet-metal exterior wall body 254 with the generally planar inner surface 306 against the upper edge 142 of the sheet-metal structural wall body 116, against an upper edge of the sheet-metal interior wall body 118, against an upper edge of the sheet-metal structural wall body 256, and against an upper edge of the sheet-metal interior wall body 118. When the ceiling body 110 is thus positioned, the generally planar outer surface 304 of the ceiling body 110 may be fastened by welding (such as the welds 315 and 317) for example to the generally planar inner surface 128 of the sheet-metal exterior wall body 114 (and thus to the right-side wall assembly 102) and to a generally planar inner surface of the sheet-metal exterior wall body 254 (and thus to the left-side wall assembly 104). However, in alternative embodiments, the generally planar inner surface 306 of the ceiling body 110 may be fastened by welding to the generally planar inner surface 234 of the sheet-metal interior wall body 118 (and thus to the right-side wall assembly 102) and to a generally planar inner surface of the sheet-metal interior wall body 258 (and thus to the left-side wall assembly 104). Accordingly, the right-side wall assembly 102 and the left-side wall assembly 104 may thus support the ceiling body 110.

A window 318 that is larger than the window opening 308 may be positioned on the generally planar outer surface 304 of the ceiling body 110 and fastened to the ceiling body 110, for example by adhering a peripheral portion of a generally planar inner surface 320 of the window 318 to a peripheral portion of the generally planar outer surface 304 surrounding the window opening 308. Again, fastening of the window 318 is mentioned now for convenience, but in general, windows may be fastened at the end of the assembly method to prevent damaging the windows during other steps in the assembly method.

Figure 18:
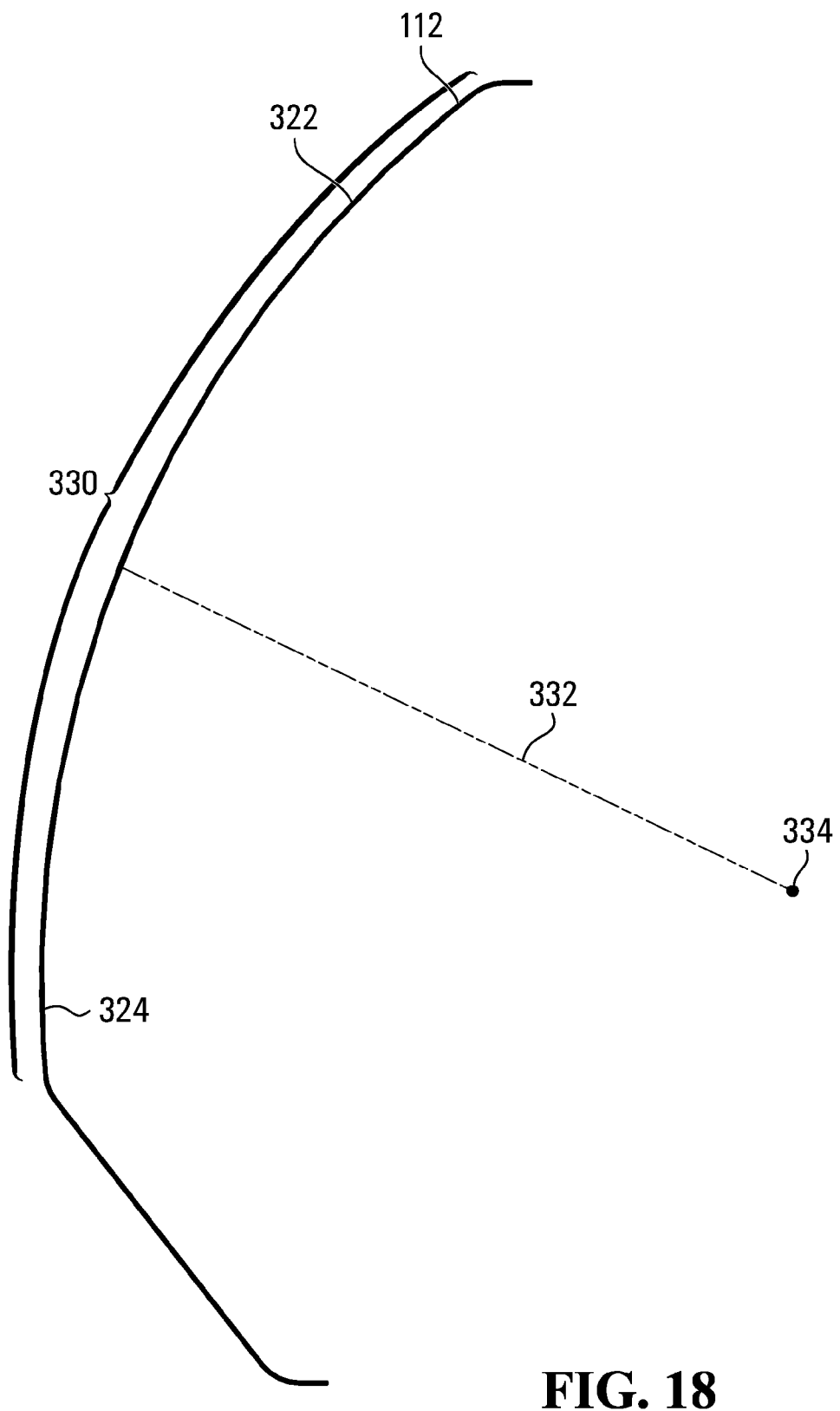
FIG. 18 is a side view of a front wall body of the operator cab assembly of FIG. 1.

Referring to FIGS. 14, 15, 17, and 18, the front wall body 112 is made from a sheet-metal body having an outer surface 322 and an inner surface 324 opposite the outer surface 322. Between the outer surface 322 and the inner surface 324, the front wall body 112 defines a window opening shown generally at 326 and a lower opening shown generally at 328. As shown in FIG. 18, a curved portion 330 of the front wall body 112 including the window opening at 326 is curved at a generally constant radius of curvature 332 relative to an axis of rotation 334, which extends generally transversely relative to the operator cab assembly 100. In this context, "generally constant" refers to a radius of curvature that may not be perfectly constant, but that results in a curve that is substantially similar to curve around a constant radius of curvature.

As shown in FIG. 17, a portion 336 of the sheet-metal exterior wall body 114 extends beyond the sheet-metal structural wall body 116 and the sheet-metal interior wall body 118, and a portion 338 of the sheet-metal exterior wall body 254 extends beyond the sheet-metal structural wall body 256 and the sheet-metal interior wall body 258. Further, as shown in FIG. 17, the front wall body 112 may be positioned between the portion 336 of the sheet-metal exterior wall body 114 and the portion 338 of the sheet-metal exterior wall body 254. Front outer edges of the sheet-metal structural wall body 116, of the sheet-metal interior wall body 118, of the sheet-metal structural wall body 256, and of the sheet-metal interior wall body 118 are also curved at the generally constant radius of curvature 332 relative to the axis of rotation 334, so that the inner surface 324 of the front wall body 112 contacts those front outer edges when the front wall body 112 may be positioned between the portion 336 of the sheet-metal exterior wall body 114 and the portion 338 of the sheet-metal exterior wall body 254. Therefore, the front outer edges of the sheet-metal structural wall body 116, of the sheet-metal interior wall body 118, of the sheet-metal structural wall body 256, and of the sheet-metal interior wall body 118 are complementary to the inner surface 324 of the front wall body 112.

When the front wall body 112 is positioned as shown in FIG. 17 between the portion 336 of the sheet-metal exterior wall body 114 and the portion 338 of the sheet-metal exterior wall body 254 with the inner surface 324 of the front wall body 112 against the front outer edges of the sheet-metal structural wall body 116, of the sheet-metal interior wall body 118, of the sheet-metal structural wall body 256, and of the sheet-metal interior wall body 118, the outer surface 322 of the front wall body 112 may be fastened by welding (such as the welds 340 and 342) for example to the generally planar inner surface 128 of the sheet-metal exterior wall body 114 (and thus to the right-side wall assembly 102) and to a generally planar inner surface of the sheet-metal exterior wall body 254 (and thus to the left-side wall assembly 104). In alternative embodiments, the inner surface 324 of the front wall body 112 may be fastened by welding to the generally planar inner surface 234 of the sheet-metal interior wall body 118 (and thus to the right-side wall assembly 102) and to a generally planar inner surface of the sheet-metal interior wall body 258 (and thus to the left-side wall assembly 104). Accordingly, the right-side wall assembly 102 and the left-side wall assembly 104 may thus support the front wall body 112.

A window 344 is curved similarly to the curved portion 330 of the front wall body 112 such that an inner surface 346 of the window 344 may be positioned against the outer surface 322 of the front wall body 112 in the curved portion 330. The window 344 is also larger than the window opening 326 and may be fastened to the front wall body 112, for example by adhering a peripheral portion of the inner surface 346 of the window 344 to a peripheral portion of the outer surface 322 surrounding the window opening 326. The curvature of the window at a generally constant radius of curvature may minimize distortion and improve operator visibility. Again, fastening of the window 344 is mentioned now for convenience, but in general, windows may be fastened at the end of the assembly method to prevent damaging the windows during other steps in the assembly method.

Figure 19:
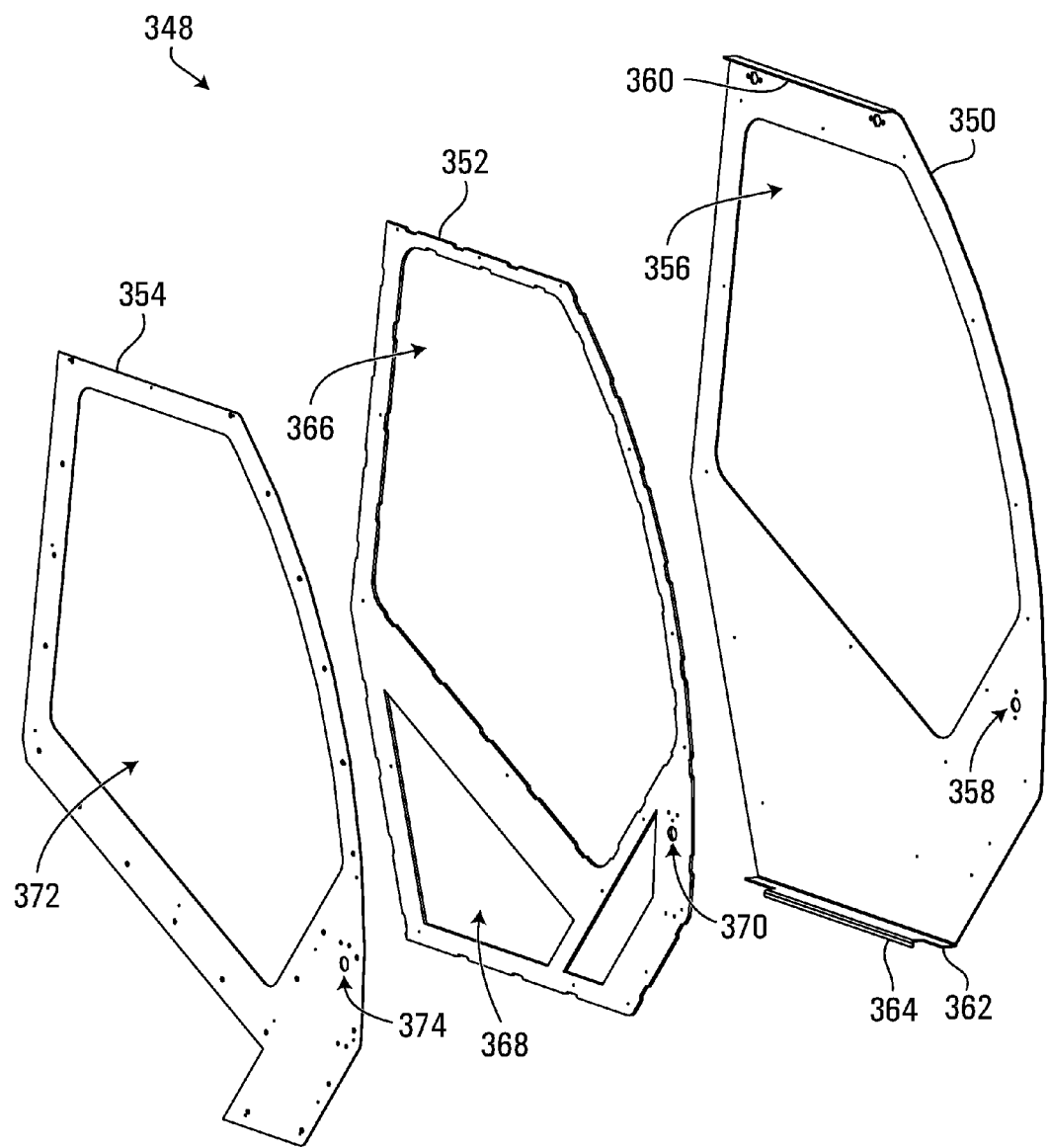
FIG. 19 is an exploded perspective view of a door assembly of the operator cab assembly of FIG. 1.

Referring to FIG. 19, a door assembly is shown generally at 348 and includes a sheet-metal exterior wall body 350, a sheet-metal structural wall body 352, and a sheet-metal interior wall body 354. The sheet-metal exterior wall body 350 defines a window opening shown generally at 356 and a door latch opening shown generally at 358. At an upper edge, the sheet-metal exterior wall body 350 defines a generally horizontal and inwardly projecting flange 360, and at a lower edge, the sheet-metal exterior wall body 350 defines a generally horizontal and inwardly projecting return flange 362 with a downwardly depending alignment flange 364. The sheet-metal structural wall body 352 defines a window opening shown generally at 366 and aligned with the window opening 356, a weight-reducing opening shown generally at 368, and a door latch opening shown generally at 370 and aligned with the door latch opening 358. The sheet-metal interior wall body 354 defines a window opening shown generally at 372 and aligned with the window opening 356 and with the window opening 366, and a door latch opening shown generally at 374 and aligned with the door latch opening 358 and with the door latch opening 370.

Figure 20:
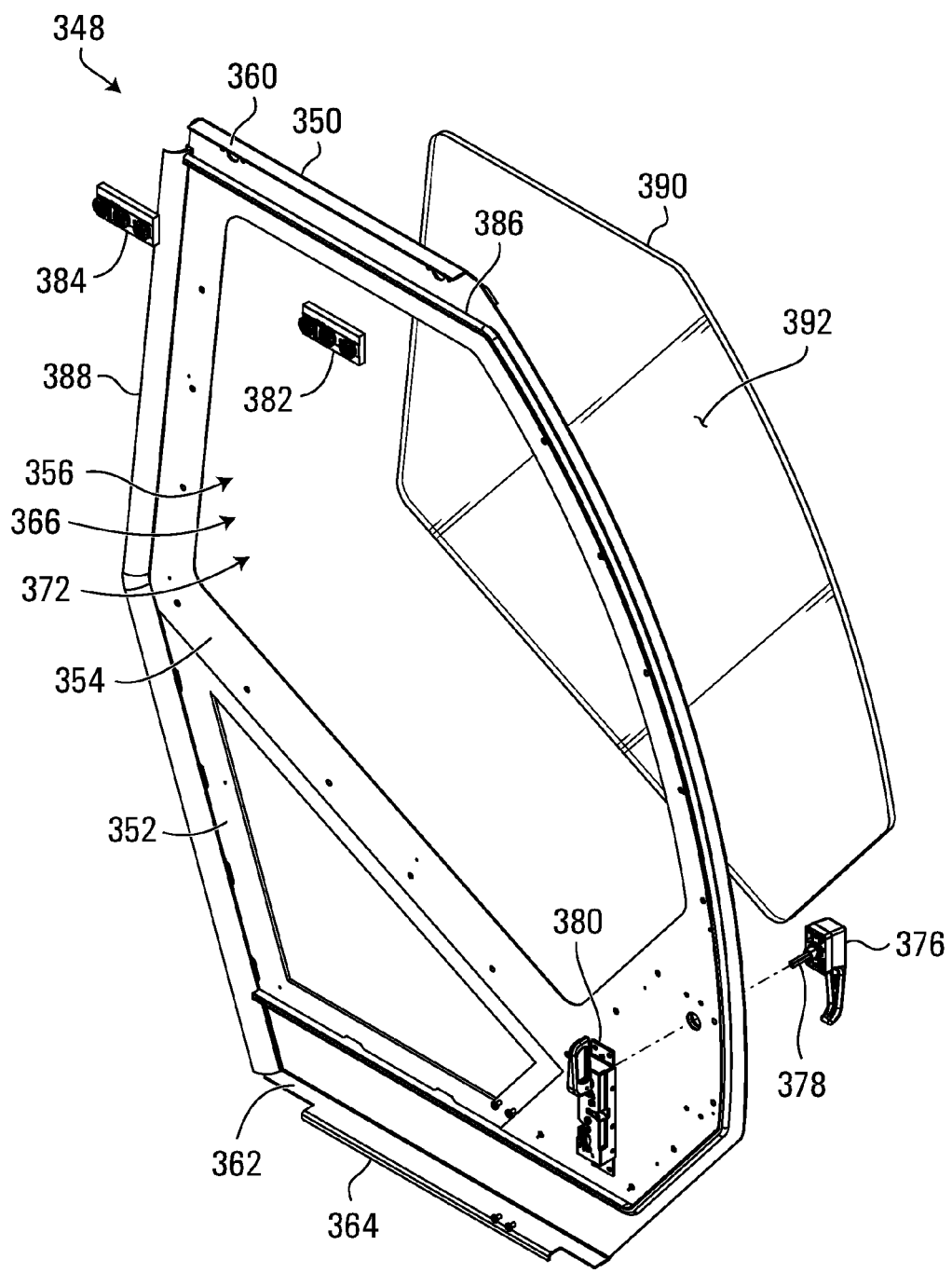
FIG. 20 is a perspective view of the door assembly of FIG. 19.

Referring to FIG. 20, the door assembly 348 is shown assembled with a generally planar inner surface of the sheet-metal exterior wall body 350 fastened to a generally planar outer surface of the sheet-metal structural wall body 352 and with a generally planar inner surface of the sheet-metal structural wall body 352 fastened to a generally planar outer surface of the sheet-metal interior wall body 354 generally as described above. Further, an exterior latch actuator assembly 376 may be fastened to a generally planar outer surface of the sheet-metal exterior wall body 350, and because the latch openings 358, 370, and 374 are aligned with each other, a shaft 378 of the exterior latch actuator assembly 376 may be received through the latch openings 358, 370, and 374 and in an interior latch actuator assembly 380 fastened to a generally planar inner surface of the sheet-metal interior wall body 354.

Further, a wheel assembly 382 and a wheel assembly 384 may be fastened to the generally planar inner surface of the sheet-metal interior wall body 354 under the inwardly projecting flange 360. In the embodiment shown, the wheel assemblies 382 and 384 are part number UTCCA2-SS from a UTILITRAK™ sliding system available from the Bishop-Wisecarver Corporation of Pittsburgh, Calif., United States of America. However, alternative embodiments may include different sliding systems.

Also, near top, front, and bottom edges of the door assembly 348, a seal flange 386 is fastened to and extends inwardly from the generally planar inner surface of the sheet-metal interior wall body 354. A seal such as bubble-rubber gasket (not shown) may be adhered to the seal flange 386 to seal the door openings 260 and 262 (shown in FIG. 13) as described below. Further, near rear edges of the door assembly 348, a rear-edge seal 388 extends inwardly from the generally planar inner surface of the sheet-metal interior wall body 354 and contacts exterior surfaces of the left-side wall assembly 104 to seal further the door openings 260 and 262 (shown in FIG. 13) when the door assembly 348 is installed against the left-side wall assembly 104 as described below.

Further, a window 390 may be received in the window opening 366 of the sheet-metal structural wall body 352 and a peripheral portion of a generally planar inner surface 392 of the window 390 may be adhered to a portion of the generally planar outer surface of the sheet-metal interior wall body 354 that faces into the window opening 366 to fasten the window 390 to the door assembly 348 generally as described above. Again, fastening of the window 390 is mentioned now for convenience, but in general, windows may be fastened at the end of the assembly method to prevent damaging the windows during other steps in the assembly method.

Figure 21:
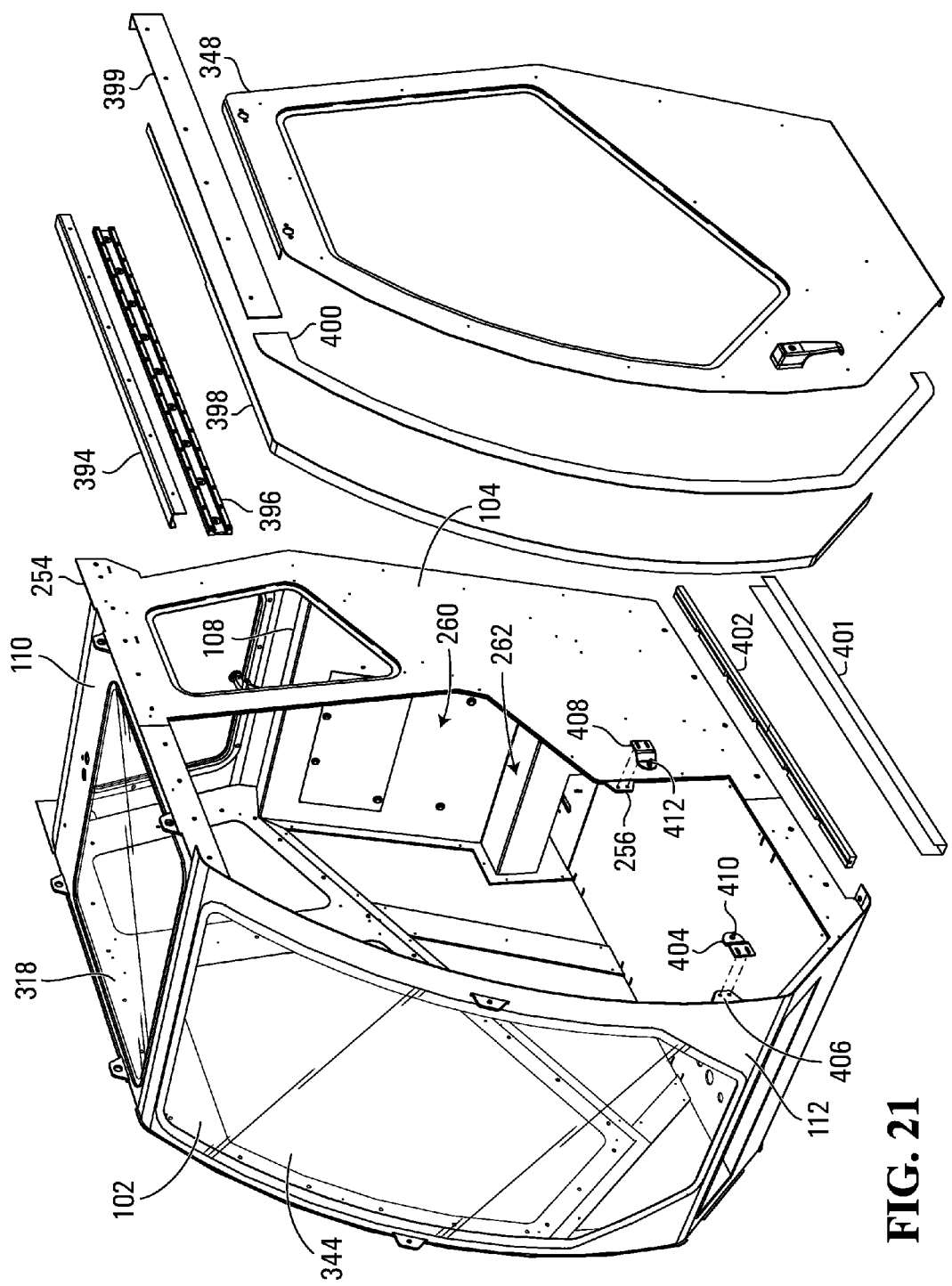
FIG. 21 is another partially assembled perspective view of the operator cab assembly of FIG. 1.

Referring to FIG. 21, a track channel 394 may be fastened to a generally planar outer surface of the sheet-metal exterior wall body 254 at an upper edge of the generally planar outer surface of the sheet-metal exterior wall body 254, and a track 396 may be fastened to the generally planar outer surface of the sheet-metal exterior wall body 254 inside the track channel 394. In the embodiment shown, the track 396 is part number UTCTPA2 from a UTILITRAK™ sliding system available from the Bishop-Wisecarver Corporation of Pittsburgh, Calif., United States of America, and the wheel assemblies 382 and 384 (shown in FIG. 20) can slide in the track 396 to allow the door assembly 348 to slide towards front and rear ends of the operator cab assembly 100 relative to the remainder of the operator cab assembly 100. In the embodiment shown, the track 396 supports the door assembly 348 against generally vertical movement relative to the remainder of the operator cab assembly 100, and the track 396 supports a top end of the door assembly 348 against generally horizontal movement towards or away from the remainder of the operator cab assembly 100.

Further, in the embodiment shown, the downwardly depending alignment flange 364 (shown in FIG. 20) may be received in a groove in a nylon track 402 in a lower door bracket 401 fastened to the generally planar outer surface of the sheet-metal exterior wall body 254 at a lower edge of the generally planar outer surface of the sheet-metal exterior wall body 254, and the track 402 may thus support a bottom end of the door assembly 348 against generally horizontal movement towards or away from the remainder of the operator cab assembly 100. However, alternative embodiments may include different sliding systems.

Further, a flange 398 may be fastened to the generally planar outer surface of the sheet-metal exterior wall body 254 under the track 396 and along a front edge of the left-side wall assembly 104, a top cover 399 may be fastened to the flange 398 to cover the top edge of the door assembly 348, and a door pocket cover 400 may be fastened to the flange 398 so that the flange 398 and the door pocket cover 400 define a door pocket for the door assembly 348. Also, a seal such as a bubble-rubber gasket (not shown) may be adhered to the lower door bracket 401 to seal the bottom of the door openings 260 and 262. Further, a seal such as a bubble-rubber gasket (not shown) may be adhered to the generally planar outer surface of the sheet-metal exterior wall body 254 to contact the rear-edge seal 388 (shown in FIG. 20) when the door assembly 348 is closed over the door openings 260 and 262 to seal further the door openings 260 and 262.

Still referring to FIG. 21, a striking bolt mounting bracket 404 is fastened to a mounting bracket 406 fastened to the sheet-metal interior wall body 258 (as shown in FIG. 10), and a striking bolt mounting bracket 408 is fastened to the sheet-metal structural wall body 256. The striking bolt mounting bracket 404 supports a striking bolt 410, and the striking bolt mounting bracket 406 supports a striking bolt 412. The interior latch actuator assembly 380 can be latched to the striking bolt 410 to close the door assembly 348 over the door openings 260 and 262, and the interior latch actuator assembly 380 can be latched to the striking bolt 412 to open the door assembly 348 and thus open the door openings 260 and 262 to allow ingress and egress of an operator. Further, a position of the striking bolt mounting bracket 404 relative to the sheet-metal interior wall body 258 is adjustable to cause the door assembly 348 to seal the door openings 260 and 262 when the door assembly 348 is closed over the door openings 260 and 262, and a position of the striking bolt mounting bracket 408 is adjustable to adjust where the door assembly 348 latches in the open position.

Figure 23:
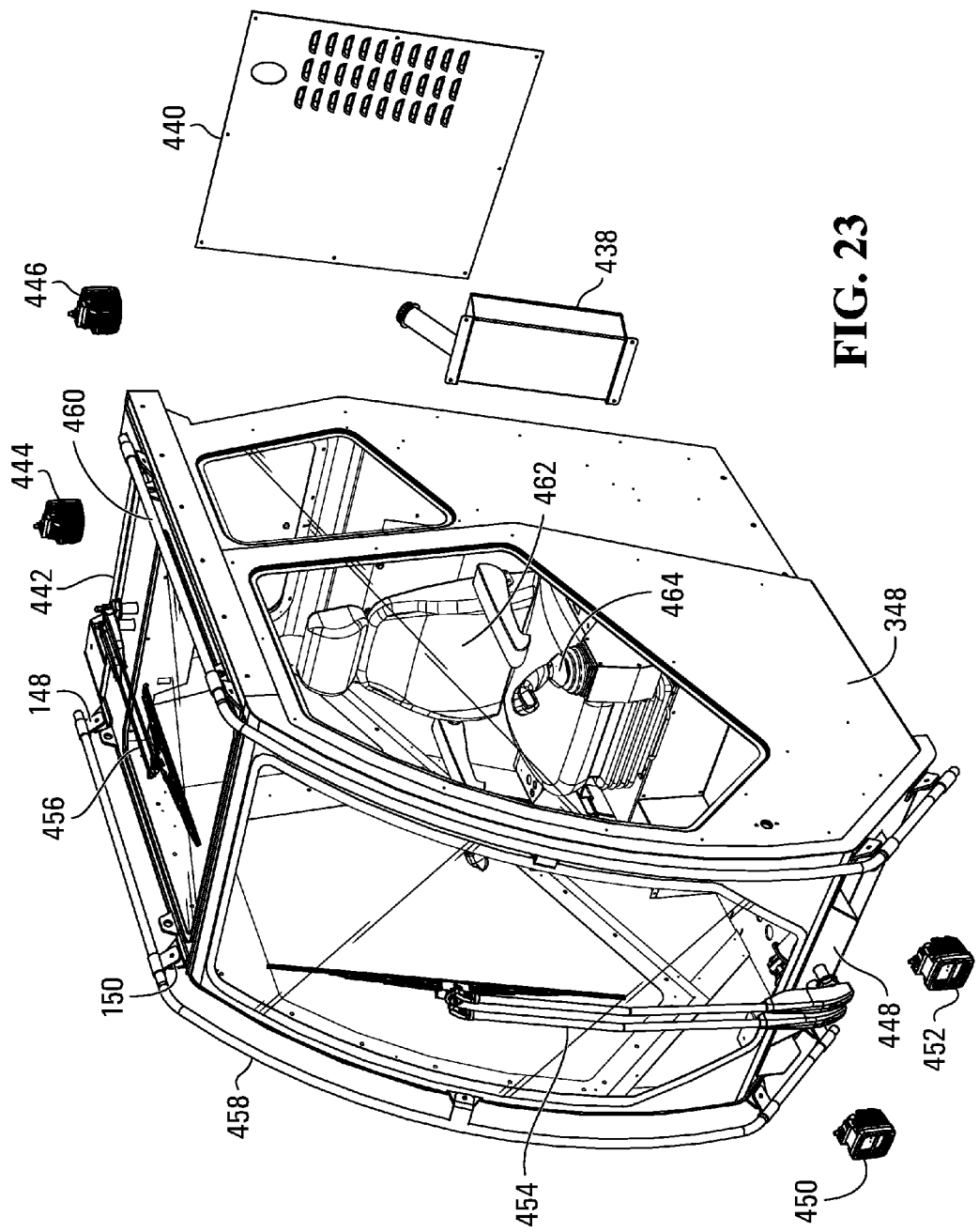
FIG. 23 is another partially assembled perspective view of the operator cab assembly of FIG. 1.

Referring to FIG. 23, assembly of the operator cab assembly 100 may continue by installing a fuel tank 438 in a rear side of the operator cab assembly 100, and by enclosing the rear side of the operator cab assembly 100 with a rear cover 440. Further, a rear light mounting bracket 442 (also shown in FIG. 1) may be fastened to the top rear of the operator cab assembly 100, and rear lights 444 and 446 may be mounted to the rear light mounting bracket 442. Also, a front mounting bracket 448 (also shown in FIG. 1) may be fastened to the lower front of the operator cab assembly 100 over the lower opening 328 (shown in FIG. 14), and front lights 450 and 452 may be mounted to the front mounting bracket 448. Further, front wiper blades 454 may be mounted to the front mounting bracket 448, ceiling wiper blades 456 may be mounted through the wiper shaft openings 310 and 312 (shown in FIGS. 14 and 15), and handrails 458 and 460 may be mounted to handrail mounting brackets such as the handrail mounting brackets 148 and 150. Other equipment (not shown), such as cameras, other lights, and other electronics for improved functionality for example, may also be installed in the operator cab assembly 100. Further, insulation (not shown) may be mounted to interior surfaces, or in weight-reducing openings, of the operator cab assembly 100.

As shown in FIGS. 23 and 24, an operator seat 462 and controls 464 may be installed in the operator cab assembly 100, and the operator cab assembly 100 may then be installed on machinery, such as a crane 466 in the embodiment shown. In other embodiments, the operator cab assembly 100 may be installed on other machinery such as a truck, agricultural equipment, soil-moving equipment, or other construction equipment for example.

Structural elements of operator cabs such as those described herein may be almost exclusively made from sheet metal, and may not require separate structural frame elements. Therefore, operator cabs such as those described herein may be lighter than operator cabs that include structural frame elements, and may be designed with more varied shapes or configurations without being constrained by how structural frame elements may be cut, bent, or otherwise shaped and positioned. Further, operator cabs such as those described herein may have thinner walls than operator cabs that include structural frame elements, which may provide more usable interior space than operator cabs that include structural frame elements or may allow for more compact exterior dimensions than operator cabs that include structural frame elements. Also, sheet metal can be precisely cut (by laser cutting, for example) and sheets of metal can be precisely aligned as described above for example, which may permit operator cabs to be manufactured from standard sheets of metal in well-defined manufacturing steps.

Although specific embodiments have been described and illustrated, such embodiments should be considered illustrative only and not as limiting the invention as construed according to the accompanying claims.

The invention claimed is:

1. A method of constructing a wall assembly of an operator cab, the method comprising:
   fastening a generally planar inner surface of a sheet-metal exterior wall body of the wall assembly to a generally planar outer surface of a sheet-metal structural wall body of the wall assembly; and
   fastening a generally planar inner surface of the sheet-metal structural wall body to a generally planar outer surface of a sheet-metal interior wall body of the wall assembly;
   wherein the sheet-metal structural wall body defines at least one weight-reducing opening extending between the generally planar inner surface of the sheet-metal structural wall body and the generally planar outer surface of the sheet-metal structural wall body; and
   wherein fastening the generally planar inner surface of the sheet-metal exterior wall body to the generally planar outer surface of the sheet-metal structural wall body comprises fastening the generally planar inner surface of the sheet-metal exterior wall body to the generally planar outer surface of the sheet-metal structural wall body when a portion of the sheet-metal exterior wall body covers the at least one weight-reducing opening.

2. The method of claim 1 further comprising:
   before fastening the generally planar inner surface of the sheet-metal exterior wall body to the generally planar outer surface of the sheet-metal structural wall body, aligning the sheet-metal exterior wall body relative to the sheet-metal structural wall body; and
   before fastening the generally planar inner surface of the sheet-metal structural wall body to the generally planar outer surface of the sheet-metal interior wall body, aligning the sheet-metal structural wall body relative to the sheet-metal interior wall body;
   wherein aligning the sheet-metal exterior wall body relative to the sheet-metal structural wall body and aligning the sheet-metal structural wall body relative to the sheet-metal interior wall body comprise positioning a plurality of fasteners through respective alignment holes in the sheet-metal exterior wall body, through respective alignment holes in the sheet-metal structural wall body, and through respective alignment holes in the sheet-metal interior wall body.

3. The method of claim 1 further comprising:
   welding a floor body directly to the sheet-metal wall assembly;
   welding a ceiling body directly to the sheet-metal wall assembly;
   welding a rear wall body directly to the sheet-metal wall assembly; and
   welding a front wall body directly to the sheet-metal wall assembly.

4. An operator cab comprising:
   a wall assembly comprising:
      a sheet-metal exterior wall body comprising a generally planar inner surface;
      a sheet-metal structural wall body comprising a generally planar inner surface and a generally planar outer surface, wherein the generally planar inner surface of the sheet-metal exterior wall body is fastened to the generally planar outer surface of the sheet-metal structural wall body, and wherein the sheet-metal structural wall body defines at least one weight-reducing opening extending between the generally planar inner surface of the sheet-metal structural wall body and the generally planar outer surface of the sheet-metal structural wall body; and
      a sheet-metal interior wall body comprising a generally planar outer surface, wherein the generally planar inner surface of the sheet-metal structural wall body is fastened to the generally planar outer surface of the sheet-metal interior wall body, and wherein a portion of the sheet-metal exterior wall body covers the at least one weight-reducing opening.

5. The operator cab of claim 4 wherein:
   the sheet-metal structural wall body defines a window opening in addition to the at least one weight-reducing opening and extending between the generally planar inner surface of the sheet-metal structural wall body and the generally planar outer surface of the sheet-metal structural wall body;
   the sheet-metal interior wall body defines a window opening extending between a generally planar inner surface of the sheet-metal interior wall body and the generally planar outer surface of the sheet-metal interior wall body;
   the window opening defined by the sheet-metal structural wall body is larger than the window opening defined by the sheet-metal interior wall body; and
   a portion of the generally planar outer surface of the sheet-metal interior wall body faces into the window opening defined by the sheet-metal structural wall body.

6. The operator cab of claim 5 further comprising a window comprising a generally planar inner surface, wherein at least a portion of the window is received within the window opening defined by the sheet-metal structural wall body, and wherein the generally planar inner surface of the window is fastened to the portion of the generally planar outer surface of the sheet-metal interior wall body.

7. The operator cab of claim 5 wherein the at least one weight-reducing opening comprises at least two weight-reducing openings, in addition to the window opening defined by the sheet-metal structural wall body, the at least two weight-reducing openings extending between the generally planar inner surface of the sheet-metal structural wall body and the generally planar outer surface of the sheet-metal structural wall body, wherein the at least two weight-reducing openings define at least one structural member in the sheet-metal structural wall body, and wherein the portion of the sheet-metal exterior wall body covers the at least two weight-reducing openings and the at least one structural member.

8. The operator cab of claim 7 wherein:
the sheet-metal structural wall body is thicker than the sheet-metal exterior wall body; and
the sheet-metal structural wall body is thicker than the sheet-metal interior wall body.

9. The operator cab of claim 4 wherein the sheet-metal exterior wall body is welded to the sheet-metal structural wall body.

10. The operator cab of claim 4 wherein the sheet-metal structural wall body is welded to the sheet-metal interior wall body.

11. The operator cab of claim 4 further comprising:
a floor body welded directly to the sheet-metal wall assembly;
a ceiling body welded directly to the sheet-metal wall assembly;
a rear wall body welded directly to the sheet-metal wall assembly; and
a front wall body welded directly to the sheet-metal wall assembly.

12. The operator cab of claim 11 wherein a portion of a lateral edge of the sheet-metal front wall body is complementary to at least a portion of a front edge of the sheet-metal structural wall body.

13. The operator cab of claim 12 wherein a portion of the sheet-metal front wall body is curved at a generally constant radius of curvature relative to a generally transverse axis of rotation.

14. The operator cab of claim 4 wherein:
the sheet-metal structural wall body is thicker than the sheet-metal exterior wall body; and
the sheet-metal structural wall body is thicker than the sheet-metal interior wall body.

15. The operator cab of claim 4 wherein the sheet-metal exterior wall body is thicker than the sheet-metal interior wall body.

16. An operator cab comprising:
a first sheet-metal wall assembly comprising a first wall of the operator cab;
a second sheet-metal wall assembly spaced apart from the first sheet-metal wall assembly and comprising a second wall of the operator cab;
a floor body comprising a floor of the operator cab and fastened directly to the first and second sheet-metal wall assemblies;
a rear wall body comprising a rear wall of the operator cab and fastened directly to the first and second sheet-metal wall assemblies and to the floor body;
a front wall body comprising a front wall of the operator cab and fastened directly to the first and second sheet-metal wall assemblies and to the floor body; and
a ceiling body comprising a ceiling of the operator cab and fastened directly to the first and second sheet-metal wall assemblies.

17. The operator cab of claim 16 wherein:
the floor body is welded directly to the first and second sheet-metal wall assemblies;
the rear wall body is welded directly to the first and second sheet-metal wall assemblies;
the front wall body is welded directly to the first and second sheet-metal wall assemblies; and
the ceiling body is welded directly to the first and second sheet-metal wall assemblies.

18. The operator cab of claim 16 wherein:
the first wall assembly comprises:
a first sheet-metal exterior wall body comprising a generally planar inner surface;
a first sheet-metal structural wall body comprising a generally planar inner surface and a generally planar outer surface, wherein the generally planar inner surface of first the sheet-metal exterior wall body is fastened to the generally planar outer surface of the first sheet-metal structural wall body; and
a first sheet-metal interior wall body comprising a generally planar outer surface, wherein the generally planar inner surface of the first sheet-metal structural wall body is fastened to the generally planar outer surface of the first sheet-metal interior wall body; and
the second wall assembly comprises:
a second sheet-metal exterior wall body comprising a generally planar inner surface;
a second sheet-metal structural wall body comprising a generally planar inner surface and a generally planar outer surface, wherein the generally planar inner surface of the second sheet-metal exterior wall body is fastened to the generally planar outer surface of the second sheet-metal structural wall body; and
a second sheet-metal interior wall body comprising a generally planar outer surface, wherein the generally planar inner surface of the second sheet-metal structural wall body is fastened to the generally planar outer surface of the second sheet-metal interior wall body.

19. The operator cab of claim 18 wherein each of the first and second sheet-metal structural wall bodies defines at least one weight-reducing opening extending between the generally planar inner surface and the generally planar outer surface.

20. The operator cab of claim 19 wherein:
a portion of the first sheet-metal exterior wall body covers the at least one weight-reducing opening of the first sheet-metal structural wall body; and
a portion of the second sheet-metal exterior wall body covers the at least one weight-reducing opening of the second sheet-metal structural wall body.

21. The operator cab of claim 16 further comprising a door assembly mounted to the second sheet-metal wall assembly to allow the door assembly to slide relative to the second sheet-metal wall assembly.

22. The operator cab of claim 21 wherein the door assembly comprises:
a third sheet-metal exterior wall body comprising a generally planar inner surface;

a third sheet-metal structural wall body comprising a generally planar inner surface and a generally planar outer surface, wherein the generally planar inner surface of the third sheet-metal exterior wall body is fastened to the generally planar outer surface of the third sheet-metal structural wall body; and a third sheet-metal interior wall body comprising a generally planar outer surface, wherein the generally planar inner surface of the third sheet-metal structural wall body is fastened to the generally planar outer surface of the third sheet-metal interior wall body.

\* \* \* \* \*